United States Patent
Satoh et al.

(10) Patent No.: US 6,894,141 B2
(45) Date of Patent: May 17, 2005

(54) MAIN CHAIN TYPE LIQUID CRYSTALLINE POLYESTER, LIQUID CRYSTALLINE COMPOSITION, METHOD FOR PRODUCING LIQUID CRYSTAL FILM AND OPTICAL FILM, AND DISPLAY HAVING OPTICAL FILM

(75) Inventors: Yasushi Satoh, Yokohama (JP); Tadahiro Kaminade, Yokohama (JP); Hitoshi Mazaki, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 10/479,837

(22) PCT Filed: Apr. 26, 2002

(86) PCT No.: PCT/JP02/04199
§ 371 (c)(1),
(2), (4) Date: Dec. 5, 2003

(87) PCT Pub. No.: WO02/100918
PCT Pub. Date: Dec. 19, 2002

(65) Prior Publication Data
US 2004/0171788 A1 Sep. 2, 2004

(30) Foreign Application Priority Data
Jun. 7, 2001 (JP) ............................ 2001-172473

(51) Int. Cl.⁷ .............................. C08G 63/02

(52) U.S. Cl. ............ 528/196; 359/109; 359/642; 428/411.1; 528/198; 528/271; 528/272

(58) Field of Search ................. 528/196, 198, 528/271, 272; 359/109, 642; 428/411.1

(56) References Cited

U.S. PATENT DOCUMENTS 5,746,949 A * 5/1998 Shen et al. ............ 252/585
6,671,031 B1 * 12/2003 Nishimura ............. 349/201
2002/0110651 A1 * 8/2002 Suzushi ................. 428/1.5

FOREIGN PATENT DOCUMENTS

| JP | 05093051 | 4/1993 |
|----|----------|--------|
| JP | 09003454 | 1/1997 |
| JP | 11158258 | 6/1999 |
| JP | 11513019 | 11/1999 |
| JP | 11513360 | 11/1999 |

* cited by examiner

*Primary Examiner*—Terressa Boykin
(74) *Attorney, Agent, or Firm*—Adams & Wilks

(57) ABSTRACT

A main chain type liquid crystalline polyester comprises at least two units selected from aromatic diol units, aromtic dicarboxylic acid units, and aromatic hydroxycarboxylic acid units as essential units and a structural unit containing a cationically polymerizable group selected from the group consisting of vinyloxy groups, epoxy groups, and oxetany groups in at least one of the terminal ends of the main chain.

10 Claims, 7 Drawing Sheets

US 6,894,141 B2

MAIN CHAIN TYPE LIQUID CRYSTALLINE POLYESTER, LIQUID CRYSTALLINE COMPOSITION, METHOD FOR PRODUCING LIQUID CRYSTAL FILM AND OPTICAL FILM, AND DISPLAY HAVING OPTICAL FILM

CROSS-REFERENCE TO RELATED APPLICATIONS

This application is a U.S. national stage application of copending International Application No. PCT/JP02/04199, filed Apr. 26, 2002, claiming a priority date of Jun. 7, 2001, and published in a non-English language.

BACKGROUND OF THE INVENTION

1. Field of the Invention

The present invention relates to a novel polymerizable main chain type liquid crystalline polyester, a liquid crystalline composition containing such a main chain type liquid crystalline polyester, a method for producing a liquid crystal film obtained by polymerizing such a liquid crystalline composition, an optical film produced by such a method, and a display equipped with such an optical film.

2. Background Information

Studies and developments have been actively done to utilize liquid crystalline compounds as optical materials, and many of the compounds have already been put in practical use. When a liquid crystalline compound is used as an optical material, it is requisite to retain the structure of the liquid crystal having been aligned and fixed, under practical service conditions. There have been proposed methods for fixing a liquid crystal structure wherein a polymerizable liquid crystalline compound is used, wherein a polymeric liquid crystalline substance is used, and wherein a polymeric liquid crystalline substance having a polymerizable reactive group is used.

Published Japanese translation of PCT Application Nos. 11-513019 and 11-513360 disclose methods wherein polymerizable liquid crystalline compounds are used. The polymerizable liquid crystalline compounds are low molecular weight liquid crystalline compounds containing two or three benzene rings bonded via ester groups, as a mesogen. In the case of using such low molecular weight liquid crystalline compounds as materials of an optical film, a method is possibly used wherein the compounds are heat-melted and then coated in a liquid crystal state over a film substrate. However, it is difficult to obtain a uniform film with a high accuracy in thickness by this method. Furthermore, in the case of using the compound in the form of a solution, there frequently arises a difficulty in coating such a solution over a film due to the low solution viscosity. Therefore, in order to produce a self-standing type optical film, the abovementioned publications propose methods wherein a glass cell after a liquid crystal material is filled thereinto is subjected to heating and ultraviolet irradiation so as to cure the material, and the glass substrates are removed from the cured material. However, these methods are rather complicated, comparing with a method wherein a liquid crystal material is coated over a film substrate.

Japanese Patent Laid-Open Publication No. 11-158258 discloses a method using a polymeric liquid crystalline substance which is a liquid crystalline polyester with excellent properties to retain the liquid crystal orientation. However, as a result of the widespread of mobile devices, an optical film comprised of such a liquid crystalline polyester has been demanded to have properties to retain the liquid crystal orientation under more sever practical use conditions and more excellent mechanical strength as well.

A method using a polymeric liquid crystalline substance having a polymerizable reactive group is disclosed in Japanese Patent Laid-Open Publication No. 9-003454. The former proposes a method wherein a polymerizable reactive group is introduced into the polymeric main chain, and the latter proposes a method wherein monomer units having a polymerizable reactive group are introduced into the side chains. However, since in either of these methods the liquid crystallinity of the material used is decreased due to the introduction of polymerizable reactive groups, there is a limit to the amount thereof and thus sufficient mechanical strength can not be obtained. Therefore, alternative methods have been demanded.

The object of the present invention is to provide a polymerizable main chain type liquid crystalline polyester with an excellent capability to retain the liquid crystal orientation after having been aligned and fixed and excellent mechanical strength and also an optical film obtained from the liquid crystalline polyester.

SUMMARY OF THE INVENTION

The present inventors developed a main chain type liquid crystalline polyester wherein a structural unit which is polymerizable after having been aligned is introduced as a structural unit and also a novel optical film which is produced by forming the liquid crystalline polyester into a film, with an excellent capability to retain the liquid crystal orientation having been aligned and excellent mechanical strength.

That is, according to a first aspect of the present invention, there is provided a main chain type liquid crystalline polyester which comprises at least two units selected from aromatic diol units, aromatic dicarboxylic acid units, and aromatic hydroxycarboxylic acid units as essential units and a structural unit containing a cationically polymerizable group in at least one of the terminal ends of the main chain.

According to a second aspect of the present invention, there is provided the main chain type liquid crystalline polyester of the first aspect wherein the diol units are catechol derivatives represented by the following general formula:

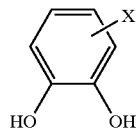

wherein —X is selected from the following groups: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN.

According to a third aspect of the present invention, there is provided the main chain type liquid crystalline polyester of the first or second aspect wherein it exhibits liquid crystallinity when it is in a molten state and is from 0.03 to 0.50 dl/g in inherent viscosity n measured in a phenol/tetrachloroethane mixed solvent (weight ratio: 60/40) at a temperature of 30° C.

According to a fourth aspect of the present invention, there is provided the main chain type liquid crystalline polyester of any of the first to third aspects wherein the cationically polymerizable group is selected from the group consisting of the vinyloxy groups, epoxy groups, and oxetanyl groups.

According to a fifth aspect of the present invention, there is provided the main chain type liquid crystalline polyester of any of the first to fourth aspects wherein it is obtained by polymerizing at least two kinds of compounds selected from the group consisting of aromatic diols represented by formula A below, aromatic dicarboxylic acids represented by formula B below, and aromatic hydroxycarboxylic acids represented by formula C below and a mono-functional aromatic compound containing a cationically polymerizable group represented by formula D below:

A:

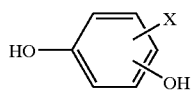

B:

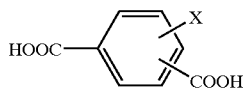

C:

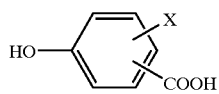

D:

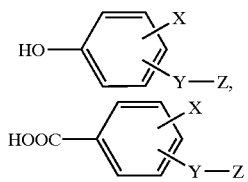

wherein —X, —Y, and —Z each represent any of the following groups as per structural unit:

—X: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN;

—Y: direct bond, —(CH$_2$)$_n$—, —O—, —O—(CH$_2$)$_n$—, —(CH$_2$)$_n$—O—, —O—(CH$_2$)$_n$—O—, —O—CO—, —CO—O—, —O—CO—(CH$_2$)$_n$—, —CO—O—(CH$_2$)$_n$—, —(CH$_2$)$_n$—O—CO—, —(CH$_2$)$_n$—CO—O—, —O—(CH$_2$)$_n$—O—CO—, —O—(CH$_2$)$_n$—CO—O—, —O—CO—(CH$_2$)$_n$—O—, —CO—O—(CH$_2$)$_n$—O—, —O—CO—(CH$_2$)$_n$—O—CO—, —O—CO—(CH$_2$)$_n$—CO—O—, —CO—O—(CH$_2$)$_n$—O—CO— or —CO—O—(CH$_2$)$_n$—CO—O— (n is an integer of from 1 to 12); and —Z:

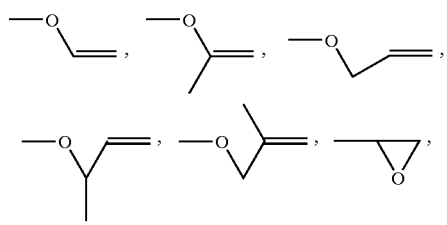

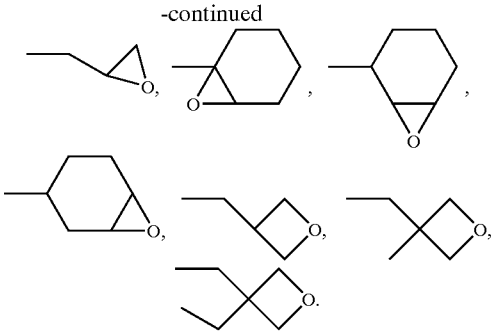

According to a sixth aspect of the present invention, there is provided a liquid crystalline composition comprising the main chain type liquid crystalline polyester of any of the first to third aspects and a photo cationic initiator and/or a thermal cationic initiator.

According to a seventh aspect of the present invention, there is provided a method of producing a liquid crystal film wherein after a layer of the liquid crystalline composition of the six aspect is formed over a film having an aligning capability and then aligned in a liquid crystal orientation by heating, the liquid crystal orientation is fixed by subjecting the composition to a photo irradiation and/or a heat treatment so as to polymerize the cationically polymerizable group.

According to a eighth aspect of the present invention, there is provided an optical film produced by the method of the seventh aspect.

According to a ninth aspect of the present invention, there is provided the optical film of the eighth aspect having a function of any of a uniaxial or twisted optical retardation film, a cholesterically oriented type circular polarization reflective film, and a nematic hybrid oriented type compensation film.

According to a tenth aspect of the present invention, there is provided a display equipped with at least one sheet of the optical film of the ninth aspect.

DETAILED DESCRIPTION OF THE PREFERRED EMBODIMENTS

Figure 1:
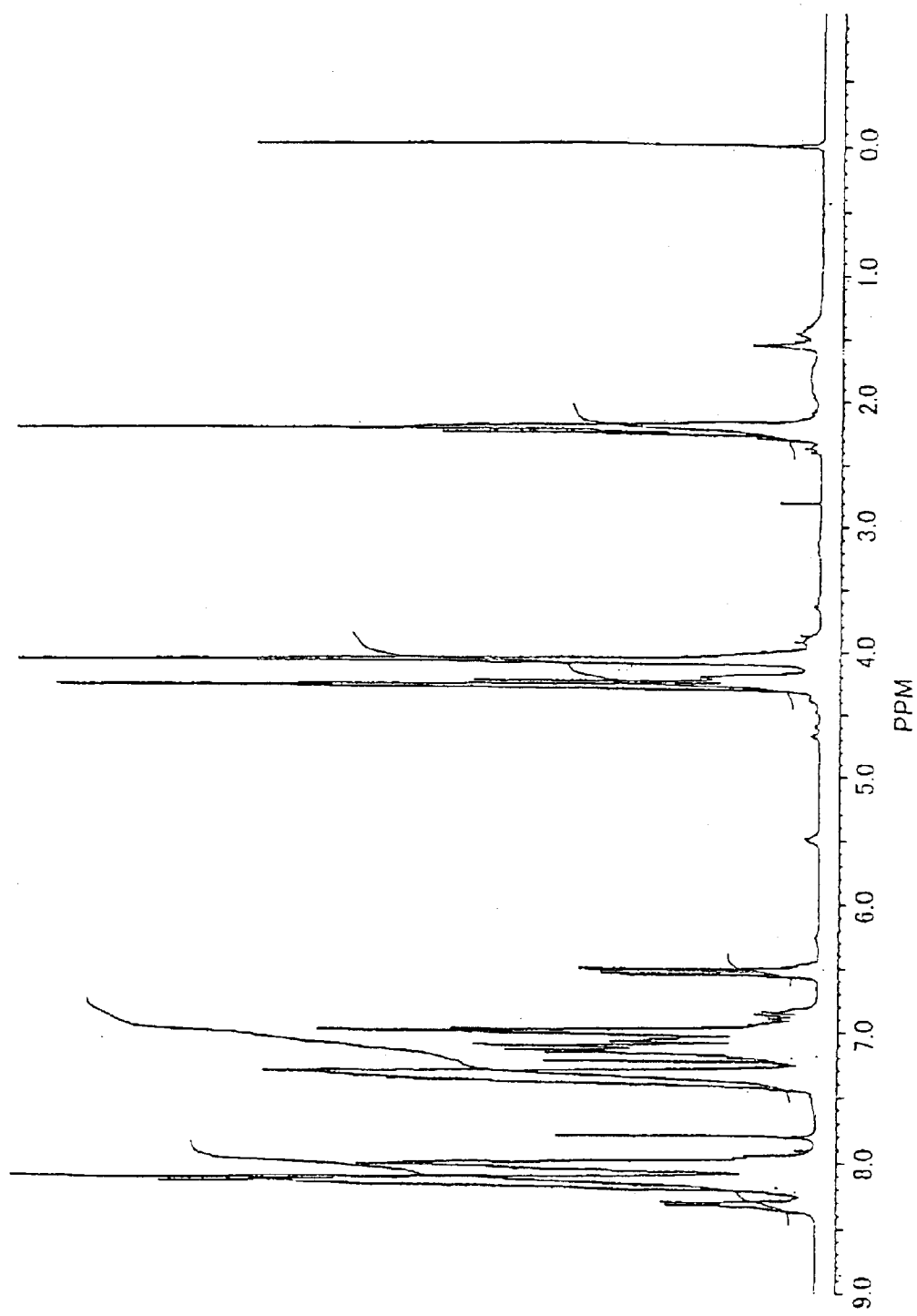
FIG. 1 shows the NMR spectrum chart of the liquid crystalline polyester 1 obtained in Example 1.

The present invention will be described hereinafter in more detail with reference to FIGS. 1–7.

The main chain type liquid crystalline polyester of the present invention comprises at least two units selected from aromatic diol units (hereinafter referred to as "Structural Unit (A)"), aromatic dicarboxylic acid units (hereinafter referred to as "Structural Unit (B)"), and aromatic hydroxycarboxylic acid units (hereinafter referred to as "Structural Unit (C)"), as essential units and a structural unit containing a cationically polymerizable group in at least one of the terminal ends of the main chain.

First of all, Structural Units (A), (B), and (C) will be described.

In the present invention, compounds to be used for introducing Structural Unit (A) may be catechol, resorcin, hydroquinone, substituents thereof, 4,4'-biphenol, 2,2',6,6'-tetramethyl-4,4'-biphenol, and 2,6-naphthalene diol. More specifically, the compounds are preferably catechol, resorcin, hydroquinone, and substituents thereof represented by the following general formula

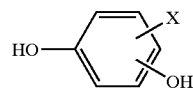

wherein —X is selected from the following groups: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN.

Particularly preferred are compounds represented by the formula

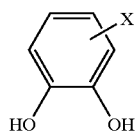

wherein —X is selected from the following groups: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN.

Compounds to be used for introducing Structural Unit (B) may be terephthalic acid, isophthalic acid, phthalic acid, substituents thereof, 4,4'-stilbenedicarboxylic acid and substituents thereof, 2,6-naphthalenedicarboxylic acid, and 4,4'-biphenyldicarboxylic acid. Preferred compounds are terephthalic acid, isophthalic acid, phthalic acid, and substituents thereof. Particularly preferred are compounds represented by the following general formula

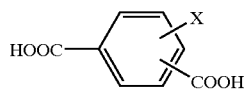

wherein —X is selected from the following groups: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN.

Compounds to be used for introducing Structural Unit (C) may be hydroxybenzoic acid and substituents thereof, 4'-hydroxy-4-biphenylcarboxylic acid and substituents thereof, 4'-hydroxy-4-stilbenecarboxylic acid and substituents thereof, 6-hydroxy-2-naphthoic acid, and 4-hydroxycinnamic acid. Preferred compounds are hydroxybenzoic acid and substituents thereof, 4'-hydroxy-4-biphenylcarboxylic acid and substituents thereof, and 4'-hydroxy-4-stilbenecarboxylic acid and substituents thereof. Particularly preferred are compounds represented by the following formulas:

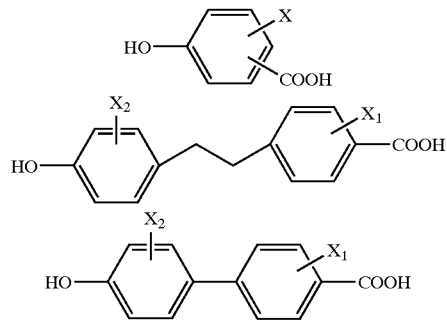

wherein —X, —X$_1$, and —X$_2$ are each selected from the following groups:

—H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$)CH$_3$, —CH(CH$_3$)CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$, and —CN.

The main chain type liquid crystalline polyester of the present invention may be any compounds as long as they comprise at least two units selected from aromatic diol units, aromatic dicarboxylic acid units, and aromatic hydroxycarboxylic acid units and a structural unit containing a cationically polymerizable group (hereinafter referred to as "Structural Unit (D)") in at least one of the terminal ends of the main chain, as essential units and exhibit a thermotropic liquid crystallinity. Therefore, no particular limitation is imposed on other structural units as long as they can meet these requirements.

In the main chain type liquid crystalline polyester of the present invention, the proportion of Structural Units (A), (B), and (C) in all the structural units is generally from 20 to 99 percent, preferably from 30 to 95 percent, and particularly preferably from 40 to 90 percent when Structural Units (A), (B), and (C) are indicated by a ratio of the total weight of diol, dicarboxylic acid, or hydroxycarboxylic acid in the amount of all monomers to be charged. Proportions of less than 20 percent would narrow the temperature range at which liquid crystallinity is exhibited, while those of more than 99 percent would cause the formation of a relatively few units having a cationically polymerizable group essential for the main chain type liquid crystalline polyester, resulting in a failure to the enhancement of the orientation-retaining capability and mechanical strength.

Next, described will be Structural Unit (D) having a cationically polymerizable group.

The cationically polymerizable group is preferably a functional group selected from the group consisting of epoxy, oxetanyl, and vinyloxy groups.

Compounds to be used for introducing Structural Unit (D) are aromatic compounds having a phenolic hydroxyl group or a carboxylic acid group to which a cationically polymerizable functional group selected from epoxy, oxetanyl, and vinyloxy groups are bonded, as represented by the formulas given below. The compounds may have a suitable spacer between the aromatic ring and the cationically polymerizable group.

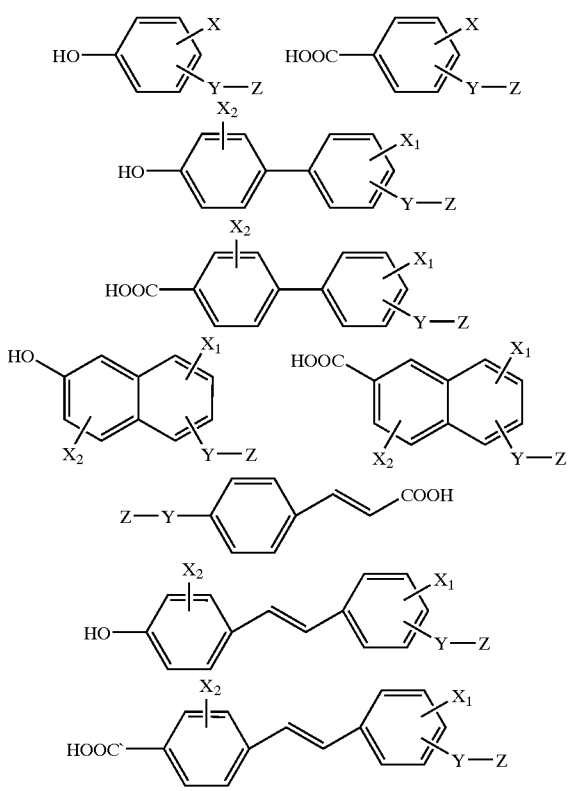

wherein —X, —X₁, —X₂, —Y, and —Z are each selected from the following groups as per structural unit:

- —X, —X₁, —X₂: —H, —CH₃, —C₂H₅, —CH₂CH₂CH₃, —CH(CH₃)₂, —CH₂CH₂CH₂CH₃, —CH₂CH(CH₃)CH₃, —CH(CH₃)CH₂CH₃, —C(CH₃)₃, —OCH₃, —OC₂H₅, —OC₆H₅, —OCH₂C₆H₅, —F, —Cl, —Br, —NO₂ and —CN;
- —Y: direct bond (Z bonds to the ring directly without via Y), —(CH₂)ₙ—, —O—, —O—(CH₂)ₙ—, —(CH₂)ₙ—O—, —O—(CH₂)ₙ—O—, —O—CO—, —CO—O—, —O—CO—(CH₂)ₙ—, —CO—O—(CH₂)ₙ—, —(CH₂)ₙ—O—CO—, —(CH₂)ₙ—CO—O—, —O—(CH₂)ₙ—O—CO—, —O—(CH₂)ₙ—CO—O—, —O—CO—(CH₂)ₙ—O—, —CO—O—(CH₂)ₙ—O—, —O—CO—(CH₂)ₙ—O—CO—, —O—CO—(CH₂)ₙ—CO—O—, —CO—O—(CH₂)ₙ—O—CO— or —CO—O—(CH₂)ₙ—CO—O— (n is an integer of from 1 to 12); and
- —Z:

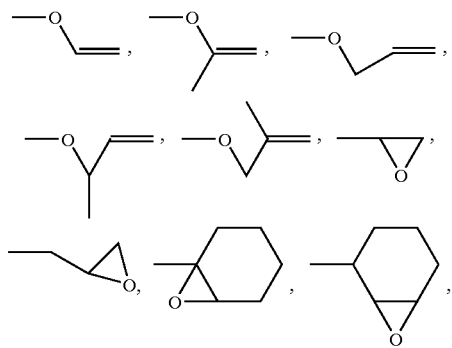

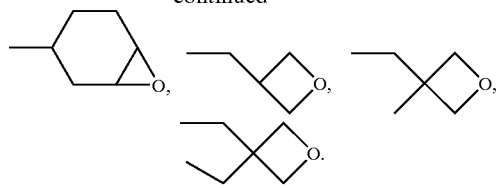

In Structural Unit (D), a cationically polymerizable group or a substituent containing the same and a phenolic hydroxyl group or a carboxylic group are preferably bonded at 1,4-position when the main chain to which they bond is a benzene ring, at 2,6-position when the main chain to which they bond is a naphthalene ring, and at 4,4'-position when the main chain to which they bond is a biphenyl or stilbene main chain with the objective of excellent liquid crystallinity. More specifically, preferred are 4-vinyloxybenzoic acid, 4-vinyloxyphenol, 4-vinyloxyethoxybenzoic acid, 4-vinyloxyethoxyphenol, 4-glycidyloxybenzoic acid, 4-glycidyloxyphenol, 4-(oxetanylmethoxy)benzoic acid, 4-(oxetanylmethoxy)phenol, 4'-vinyloxy-4-biphenylcarboxylic acid, 4'-vinyloxy-4-hydroxybiphenyl, 4'-vinyloxyethoxy-4-biphenylcarboxylic acid, 4'-vinyloxyethoxy-4-hydroxybiphenyl, 4'-glycidyloxy-4-biphenylcarboxylic acid, 4'-glycidyloxy-4-hydroxybiphenyl, 4'-oxetanylmethoxy-4-biphenylcarboxylic acid, 4'-oxetanylmethoxy-4-hydroxybiphenyl, 6-vinyloxy-2-naphthalenecarboxylic acid, 6-vinyloxy-2-hydroxynaphthalene, 6-vinyloxyethoxy-2-naphthalenecarboxylic acid, 6-vinyloxyethoxy-2-hydroxynaphthalene, 6-glycidyloxy-2-naphthalenecarboxylic acid, 6-glycidyloxy-2-hydroxynaphthalene, 6-oxetanylmethoxy-2-naphthalenecarboxylic acid, 6-oxetanylmethoxy-2-hydroxynaphthalene, 4-vinyloxycinnamic acid, 4-vinyloxyethoxycinnamic acid, 4-glycidyloxycinnamic acid, 4-oxetanylmethoxycinnaimic acid, 4'-vinyloxy-4-stilbenecarboxylic acid, 4'-vinyloxy-3'-methoxy-4-stilbenecarboxylic acid, 4'-vinyloxy-4-hydroxystilbene, 4'-vinyloxyethoxy-4-stilbenecarboxylic acid, 4'-vinyloxyethoxy-3'-methoxy-4-stilbenecarboxylic acid, 4'-vinyloxyethoxy-4-hydroxystilbene, 4'-glycidyloxy-4-stilbenecarboxylic acid, 4'-glycidyloxy-3'-methoxy-4-stilbenecarboxylic acid, 4'-glycidyloxy-4-hydroxystilbene, 4'-oxetanylmethoxy-4-stilbenecarboxylic acid, 4'-oxetanylmethoxy-3'-methoxy-4-stilbenecarboxylic acid, and 4'-oxetanylmethoxy-4-hydroxystilbene.

In the main chain type liquid crystalline polyester of the present invention, the proportion of Structural Unit (D) in all the structural units is generally from 1 to 60 percent and preferably from 5 to 50 percent, when Structural Unit (D) is indicated by a ratio of the total weight of carboxylic acid or phenol in the amount of all monomers to be charged. Proportions of less than 1 percent would cause a failure to the enhancement of the orientation-retaining capability and mechanical strength, while those of more than 60 percent would increase the liquid crystallinity, resulting in a narrowed temperature range at which a liquid crystallinity is exhibited.

Each of Structural Units (A) through (D) has one or two carboxylic or phenolic hydroxylic groups. At the stage of charging, each group is desirously made almost even in the sum total of equivalent number of the functional group. That is, in the case where Structural Unit (D) has a free carboxylic group, it is desirous that the relation represented by (mole number of (A)×2)=(mol number of (B)×2)+(mol number of (D)) is almost fulfilled. In the case where Structural Unit (D)

has a free phenolic hydroxylic group, it is desirous that the relation represented by (mole number of (A)×2)+(mol number of (D))=(mol number of (B)×2) is almost fulfilled. When the charging formulation extremely deviates from these relations, carboxylic acid, phenol, or derivatives thereof other than those involved with cationic polymerization will be a molecular terminal, resulting not only in insufficient cationic polymerizability but also in the occurrence of unexpected polymerization or decomposition reaction at stages other than those desired through the process, due to the presence of acid residues.

The main chain type liquid crystalline polyester of the present invention may contain structural units other than Structural Units (A) through (D). No particular limitation is imposed on such additional structural units which may, therefore, be any compounds (monomers) known in the art. For example, additional structural units may be those from naphthalene dicarboxylic acid, biphenyldicarboxylic acid, aliphatic dicarboxylic acid, compounds obtained by introducing into these compounds halogen or alkyl, biphenol, naphthalene diol, aliphatic diol, and compounds obtained by introducing into these compounds halogen or alkyl. The use of optically active compounds as the starting materials for units constituting the main chain type liquid crystalline polyester of the present invention makes it possible to impart a chiral phase thereto. No particular limitation is imposed on such optically active compounds. For example, they may be optically active aliphatic alcohols as represented by $C_nH_{2n+1}OH$ wherein n is an integer of from 4 to 14, alkoxy benzoic acids to which an optically active aliphatic group is bonded, as represented by $C_nH_{2n+1}O—Ph—COOH$ wherein n is an integer of from 4 to 14, and Ph is phenyl, menthol, camphoric acid, naproxene derivatives, binaphtol, 1,2-propanediol, 1,3-butanediol, 2-methylbutanediol, 2-chlorobutanediol, tartaric acid, methylsuccinic acid, and 3-methyladipic acid.

The molecular weight of the main chain type liquid crystalline polyester of the present invention is preferably from 0.03 to 0.50 dl/g and more preferably from 0.05 to 0.15 dl/g when it is expressed by an inherent viscosity η measured in a mixed solvent of phenol/tetrachloroethane (weight ratio: 60/40) at a temperature of 30° C. When η is smaller than 0.03 dl/g, the solution viscosity of the resulting main chain type liquid crystalline polyester would become low, leading to a possibility that when it is formed into a film, a uniform film may not be formed. When η is larger than 0.50 dl/g, the temperature at which an alignment treatment is conducted would be increased and orientation and cross-linking may occur at the same time, leading to a possibility that the orientability is decreased.

In the present invention, the molecular weight of the main chain type liquid crystalline polyester is controlled by determining the charging formulation. Specifically, the polymerization degree (average bond number of Structural Units (A) through (D)) of the resulting main chain type liquid crystalline polyester is determined by mono-functional monomers reacting in a manner that they terminate both of the molecular terminal ends, i.e., the relative content of a compound for introducing Structural Unit (D), to the total charging formulation. Therefore, in order to obtain a main chain type liquid crystalline polyester with a desired inherent viscosity, it is necessary to adjust the charging formulation depending on the types of monomers to be charged.

No particular limitation is imposed on the method for synthesizing the main chain type liquid crystalline polyester of the present invention. Therefore, there may be employed any method usually used for synthesizing polyesters. For example, there may be employed a method in which a carboxylic acid unit is activated in acid chloride or sulfonic acid anhydride and reacted with a phenol unit in the presence of a base (acid chloride method), in which a carboxylic acid unit and a phenol unit are directly condensed using a condensing agent such as DCC (dicyclohexylcarbodiimide), or in which a phenol unit is acetylated and acidolysis-polymerized, together with a carboxylic acid unit under molten conditions. However, since in the case of using acidolysis polymerization under molten conditions, there is a risk that the monomer unit having a cationically polymerizable group undergoes polymerization or decomposition unexpectedly under the reaction conditions, there frequently arises a necessity to control the reaction conditions strictly. Furthermore, under particular circumstances, it is desired to employ a method wherein a suitable protection group is used or wherein after a compound having a different functional group is brought into a reaction, a cationically polymerizable group is introduced. Alternatively, the crude main chain type liquid crystalline polyester obtained by polymerization may be purified by recrystallization and reprecipitation.

The resulting main chain type liquid crystalline polyester can be analyzed by means for analysis such as NMR (nuclear magnetic resonance method) to identify in what proportion each monomer is present in the main chain type liquid crystalline polyester. An average bond number of the main chain type liquid crystalline polyester can be calculated from the quantity ratio of the cationically polymerizable group.

In the present invention, other compounds may be blended with the main chain type liquid crystalline polyester having a cationically polymerizable group as long as they do not deviate the range specified by the present invention. For example, there may be added polymeric substances other than the main chain type liquid crystalline polyester of the present invention which substances can be kneaded thereto and various low molecular weight compounds. Such low molecular weight compounds may or may not have a liquid crystallinity and may or may not have a polymerizable group which is reactive with a cross-linkable main chain type liquid crystalline polyester. However, it is preferred to use liquid crystalline compounds having a polymerizable group such as those given below:

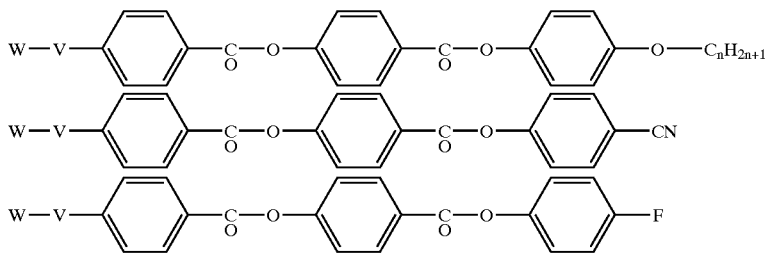

-continued

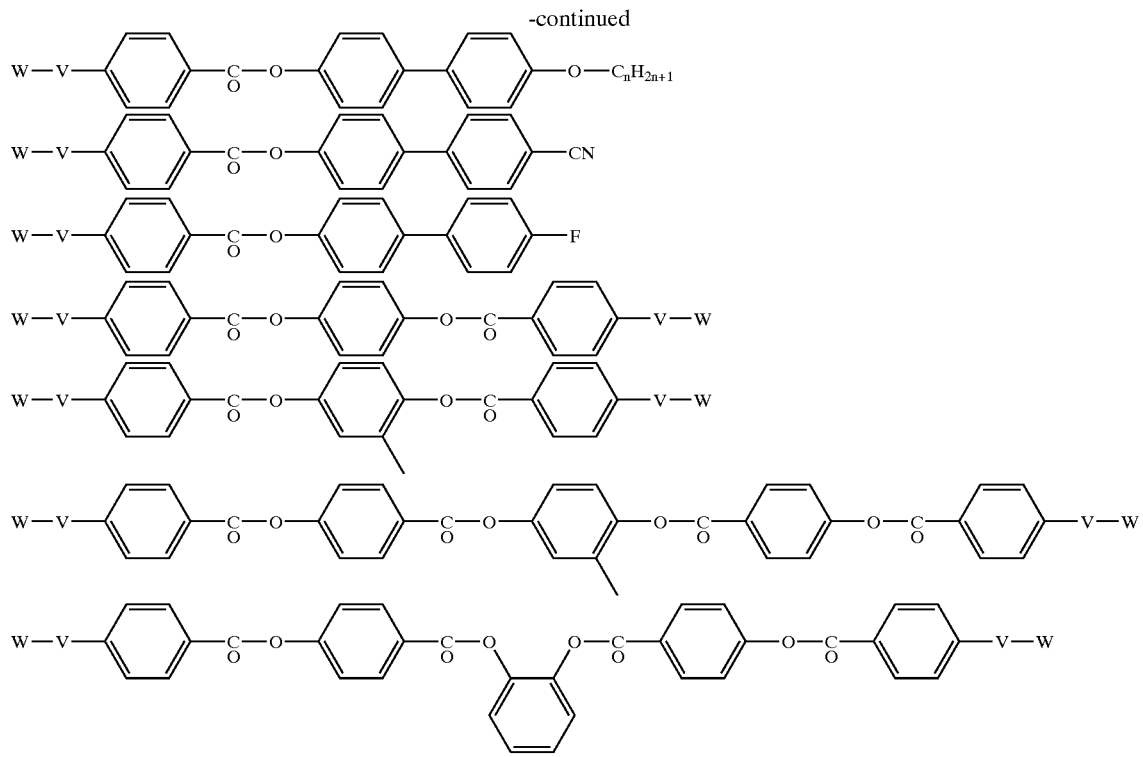

wherein n is an integer of from 2 to 12, and —V— and —W are each selected from the following groups:
—V—: direct bond (W bonds to the ring directly without via V), —O—, and —O—$C_mH_{2m}$—O— wherein m is an integer of from 2 to 12;
—W:

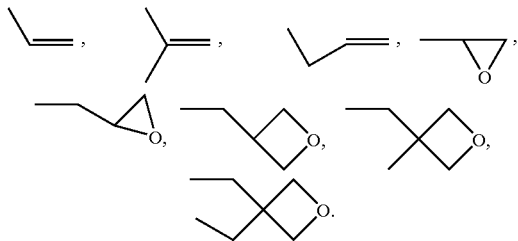

In the case where polymeric substances or low molecular weight compounds to be added are optically active, a chiral liquid crystal phase can be induced in the resulting composition. The composition can be used for the production of films aligned in a twisted nematic orientation structure or a cholesteric orientation structure.

Next, described will be a method for producing a liquid crystal film using the main chain type liquid crystalline polyester synthesized in the above-described manner. Although the method is not restricted to the method described below, it desirously goes through each of the steps included therein.

The optical film comprised of the main chain type liquid crystalline polyester of the present invention may be in any forms such as one wherein a liquid crystal film is kept on an alignment substrate, i.e., (alignment substrate/(alignment layer)/liquid crystal film), one wherein a liquid crystal film is transferred to a transparent substrate film other than an alignment substrate, i.e., (transparent substrate film/liquid crystal film), or one which is a single layer of a liquid crystal film when it has a self-standing property.

Examples of alignment substrates used in the present invention are films of such as polyimide, polyamide, polyamideimide, polyphenylene sulfide, polyphenylene oxide, polyether ketone, polyetherether ketone, polyether sulfone, polyethylene terephthalate, polyethylene naphthalate, polyarylate, triacetyl cellulose, epoxy resins, and phenol resins and uniaxially stretched films thereof. Some of these films exhibit a sufficient capability to align the main chain type liquid crystalline polyester of the present invention depending on the production method of the films even though they are not subjected to an aligning treatment. However, if a film does not have an aligning capability sufficiently or at all, the film may be stretched under an appropriate heating treatment; subjected to a rubbing treatment wherein the film is rubbed in one direction with a rayon cloth or wherein the film is rubbed after a conventional alignment layer of polyimide, polyvinyl alcohol, or a silane coupling agent is formed over the film; or subjected to the combination of these treatments to be provided with an aligning capability. Alternatively, the aligning substrate may be metal plates of aluminum, iron, or copper and various glass plates on which surfaces fine grooves are regularly formed.

In the case where an alignment substrate is not optically isotropic or makes the resulting liquid crystal film opaque at a wavelength region where it is intended to be used, the liquid crystal film may be transferred from such an alignment substrate to an optically isotropic film or a substrate which is transparent at a wavelength region where the liquid crystal film is intended to be used. The transferring method may be those as disclosed in Japanese Patent Laid-Open Publication Nos. 4-57017 and 5-333313 wherein after a liquid crystal film layer with an alignment substrate is laminated via a pressure sensitive adhesive or adhesive over a substrate on which the liquid crystal layer is to be transferred and the adhesive is cured, only the liquid crystal film is peeled off from the substrate so as to be transferred on the substrate.

Examples of transparent substrate onto which the liquid crystal layer is transferred are triacetyl cellulose films such as Fujitack (manufactured by Fuji Photo Film Co., Ltd.) and Konicatack (manufactured by Konica Corp.); transparent films such as TPX film (manufactured by Mitsui Chemical Inc.), Arton film (manufactured by JSR), Zeonex film (manufactured by Nippon Zeon Co., Ltd) and Acryprene film (manufactured by Mitsubishi Rayon Co., Ltd.). If necessary, the liquid crystal film may be transferred to a transparent polarizing film. Alternatively, a quartz plate or a glass may be used. The polarizer may be used regardless of whether or not a protective layer is used.

No particular limitation is imposed on the pressure sensitive adhesive or adhesive to be used for transferring the liquid crystal film as long as it is of optical grade. Therefore, there may be used conventional acrylic-, epoxy-, ethylene-vinyl acetate copolymer-, rubber-, urethane-based ones, mixture types thereof, or various reactive ones of such as thermal setting type and/or photo curing type or electron radiation curing types.

The reaction conditions, i.e., conditions for curing the reactive pressure sensitive adhesives or adhesives vary depending on the formulation, viscosity and reaction temperature thereof. Therefore, the curing may be conducted under the conditions properly selected. For example, photo-curing type pressure sensitive adhesives or adhesives may be cured at a similar irradiation dose using a similar light source to those used for a photo cation generator described hereinafter. The electron radiation curing type pressure sensitive adhesives may be cured at an accelerating voltage of usually 25 kV to 200 kV and preferably 50 kV to 100 kV.

The optical film formed from the main chain type liquid crystalline polyester of the present invention or the composition containing the same may be produced by a method wherein the main chain type liquid crystalline polyester or the composition containing the same in a molten state or in the form of a solution is coated over an alignment substrate. However, the method using a solution is preferred with the objective of a uniform film thickness. The coated layer is then dried and heated to be aligned in a liquid crystal orientation and subjected to an photo irradiation and/or a heat treatment for polymerization.

No particular limitation is imposed on the solvent used for preparing the solution as long as it can dissolve the main chain type liquid crystalline polyester or composition of the present invention and be evaporated under appropriate conditions. Preferred examples of the solvent are ketones such as acetone, methylethyl ketone, and isophorone; ether alcohols such as butoxyethyl alcohol, hexyloxyethyl alcohol, and methoxy-2-propanol; glycol ethers such as ethylene glycol dimethylether and diethylene glycol dimethyl ether; esters such as ethyl acetate, methoxypropyl acetate and ethyl lactate; phenols such as phenol and chlorophenol; amides such as N,N-dimethylformamide, N,N-dimethylacetoamide, and N-methylpyrrolidone; halogen-based solvents such as chloroform, tetrachloroethane, and dichlorobenzene; and mixtures thereof. A surfactant, a defoaming agent, or a leveling agent may be added to the solution so as to form a uniform film layer on an alignment substrate.

No particular limitation is imposed on the methods of coating the liquid crystalline material as it is or the solution thereof as long as they can ensure the uniformity of the film layer. Therefore, there may be used any conventional method such as spin coating, die coating, curtain coating, dip coating, and roll coating methods. The coating may be followed by a solvent-removing process, i.e., drying using a heater or a hot air blowing.

Thereafter, a heat treatment is conducted so as to form a liquid crystal orientation. In this heat treatment, the main chain type liquid crystalline polyester is heated to a temperature which is higher than the liquid crystal transition temperature or than the initial fluidization temperature in the case where the polyester is fixed in a glass state liquid crystal orientation at room temperature, so as to align the polyester in the liquid crystal orientation by its self-orientability. Since the conditions for the heat treatment vary in optimum conditions and limits depending on the liquid crystal phase behavior temperature (transition temperature) or type of the polymerizable functional group of the main chain type liquid crystalline polyester and liquid crystalline composition to be used, it can not be determined with certainty. However, it is within the range of usually 20 to 250° C., preferably 50 to 200° C., and more preferably 80 to 160° C. Temperatures below 20° C. are not preferred because there is a possibility that the polyester or composition may not be fluidized sufficiently and thus may not be aligned in a liquid crystal orientation, while those in excess of 250° C. is not also preferred because the polymerizable functional group may be unexpectedly polymerized or decomposed at this stage. The heat treatment is conducted for usually 10 seconds to 2 hours, preferably 30 seconds to 1 hour, and more preferably 1 minute to 30 minutes. The heat treatment for less than 10 seconds is not preferred, because there is a possibility that the aligning of the liquid crystal phase may not be completed sufficiently. Whereas the heat treatment for longer than 2 hours is not also preferred, because the productivity is extremely deteriorated.

Thereafter, the resulting main chain type liquid crystalline polyester with a completely aligned liquid crystal orientation on the alignment substrate is cross-linked by a polymerization reaction. In the present invention, the cross-linking is conducted so as to modify the main chain type liquid crystalline polyester to be a harder film layer while maintaining a completed liquid crystal orientation formed therein.

Since the main chain type liquid crystalline polyester of the present invention is cationically polymerizable, it is necessary to use suitable polymerization initiators for polymerization and cross-linking. No particular limitation is imposed on the polymerization initiators as long as they are compounds capable of generating cations by light or heat. Examples of the polymerization initiators are compounds having a trichloromethyl group or a quinonediazido group and organic sulphonium-, iodonium-, and phosphonium-based compounds.

Since the amount of the polymerization initiator (hereinafter referred to as "cation generator") to be added to the main chain type liquid crystalline polyester varies depending on the type of and equivalent weight polymerizable group and the conditions for aligning the polyester in a liquid crystal orientation, it can not be determined with certainty. However, it is within the range of usually 100 ppm by mass to 20 percent by mass, preferably 1,000 ppm by mass to 10 percent by mass, more preferably 0.2 percent by mass to 5 percent by mass, and most preferably 0.5 percent by mass to 3 percent by mass, based on the main chain type liquid crystalline polyester. Amounts of less than 100 ppm by mass are not preferred because the polymerization may not progress due to the insufficient amount of cation to be generated. Amounts of more than 20 percent by mass is not also preferred because the cation generator remains in a large amount in the resulting liquid crystal film and thus the light resistance thereof would be deteriorated.

Alternatively, there may be employed a method wherein after a compound generating cations such as a Lewis acid is mixed with the main chain type liquid crystalline polyester, the cationically polymerizable group is reacted after or simultaneously with the aligning the polyester in a liquid crystal orientation. However, more sufficient liquid crystal orientation and cross-linking degree can be achieved when liquid crystal orientation and polymerization steps are separated through the process. Therefore, it is more preferred to use the following cation generators elicited by heat or light.

In the case of using a cation generator generating cations by heat (hereinafter referred to as "thermal cation generator"), a heat treatment is conducted for aligning the main chain type liquid crystalline polyester in a liquid crystal orientation at a temperature lower than the activation temperature of the thermal cation generator (50% dissociation temperature as the normal index) and then heated at a temperature which is equal to or higher than the activation temperature such that the cation generator is dissociated. Cations thus generated allow the polymerizable group to be reacted. An advantage of this method is that the aligning and cross-linking reaction can be conducted only with a heat treatment apparatus. However, since the aligning and cross-linking steps are separated only by an obverse heat, i.e., a temperature difference, this method has disadvantages that the polymerization may slightly progress upon formation of liquid crystal orientation and may not progress sufficiently during the cross-linking step. Examples of the thermal cation generator are benzylsulfonium salts, benzylammonium salts, benzylpyridinium salts, benzylphosphonium salts, hydrazinium salts, carbonic acid esters, sulfonic acid esters, amineimides, antimony pentachloride-acetyl chloride complexes, diaryliodonium salt-dibenzyloxy copper, and halogenated boron-tertiary amine adducts.

Next, described will be a cation generator generating cations by light (hereinafter referred to as "photo cation generator").

The term "photo cation generator" used herein denotes compounds which can generate cations by irradiation of a light with a suitable wavelength and may be organic sulfonium salt-, iodonium salt-, or phosphonium salt-based compounds. Counter ions of these compounds are preferably antimonate, phosphate, and borate. Specific examples are $Ar_3S^+SbF_6^-$, $Ar_3P^+BF_4^-$, and $Ar_2I^+PF_6^-$ wherein Ar indicates a phenyl or substituted phenyl group. Sulfonic acid esters, triazines, diazomethanes, β-ketosulfone, iminosulfonato, and benzoinsulfonate are also eligible.

The main chain type liquid crystalline polyester does not undergo unexpected cross-linking or decomposition thereof upon the aligning stage and thus can be aligned in a liquid crystal orientation while maintaining a sufficient flowability if the above-described photo cation generator is used and the heat treatment for aligning the polyester in a liquid crystal orientation is conducted in a dark situation, i.e., such a light shielding condition that the photo cation does not dissociate. Thereafter, the main chain type liquid crystalline polyester is polymerized and cross-linked by irradiating thereto a light with a suitable wavelength from a light source so as to allow cations to be generated. The method of irradiating a light varies in optimum values of irradiation wavelength and strength and irradiation time, depending on the type or amount of the photo cation generator. However, the light irradiation is generally conducted by irradiating a light from a light source having a spectrum in an absorption wavelength of the photo cation generator to be used such as a metal halide lamp, a high-pressure mercury lamp, a low-pressure mercury lamp, a xenon lamp, an arc discharge lamp, and a laser thereby decomposing the photo cation generator. The irradiation dose per $cm^2$ is within the range of generally 1 to 2,000 mJ and preferably 10 to 1,000 mJ in the integrated irradiation dose. However, when the absorption region of the photo cation generator is extremely different from the spectrum of the light source or the main chain type liquid crystalline polyester itself can absorb a light in the wavelength of the light source, the irradiation dose is not limited to the above range. In these cases, a method may be employed in which a suitable photo sensitizer or two or more kinds of photo cation generators having different absorption wavelengths are used.

Although the cationically polymerizable group in the main chain type liquid crystalline polyester is reacted, i.e., cross-linked with the cations dissociated by a light irradiation, sufficient cations may not be generated even though a light irradiation is conducted at room temperature or the main chain type liquid crystalline polyester may not be sufficiently cross-linked due to the decreased flowability thereof even though cations are generated. In such cases, there may be employed a method wherein a light irradiation is conducted under such heating conditions that the main chain type liquid crystalline polyester maintains the liquid crystal phase and is sufficiently fluidized or a so-called post cure method wherein after a light is irradiated at room temperature, the main chain type liquid crystalline polyester is heated to a temperature at which it can be fluidized.

The cross-linked main chain type liquid crystalline polyester layer produced through the above-described processes becomes a sufficiently solid and strong film, differently from that before being cross-linked. More specifically, since the three-dimensional bond of the mesogen portions is achieved by the curing reaction, the main chain type liquid crystalline polyester layer is improved not only in heat-resistance (rise of the temperature at which the liquid crystal orientation is maintained) but also in mechanical strength such as resistance to scratch, wear and cracking. The present invention is of great significance in the industrial sense because it can achieve the directly-opposed purposes, i.e., the control of a liquid crystal orientation at ease and the improvements of the thermal/mechanical strength, at the same time.

The proper selection of compounds to be blended with the main chain type liquid crystalline polyester having a cationically polymerizable group enables to control the alignment structure of a composition containing the polyester and enables to produce optical films wherein a nematic orientation, a twisted nematic orientation, a cholesteric orientation, or a nematic hybrid orientation is fixed. Such optical films have various applications depending on their alignment structure.

Among these films, those wherein a nematic or twisted nematic orientation is fixed function as optical retardation films and can be used as compensation plates for an STN-, TN-, OCB-, or HAN-transmission or reflection type liquid crystal display. Optical films wherein a cholesteric orientation is fixed can be used as polarizing reflective films for luminance enhancement, reflection color filters, and various decoration films utilizing color variations of reflection light depending on viewing angles due to the selective reflection. Those wherein a nematic hybrid orientation is fixed can be used as optical retardation films or wave plates utilizing a retardation upon viewing from the front and a viewing angle improving film for TN-type liquid crystal displays utilizing the asymmetric nature of viewing angle dependency of retardation. Furthermore, those having a function as a ¼ wavelength plate in combination with a polarizer can be used as anti-glare filters for reflection type liquid crystal displays and EL displays.

The main chain type liquid crystalline polyester of the present invention is excellent in orientability, and the composition produced from the polyester is high in heat resistance (glass transition point) and hardness and excellent in mechanical strength and thus useful as retardation films for various liquid crystal displays.

BEST MODE FOR CARRYING OUT THE INVENTION

The present invention will be further described in the following examples, but the present invention should not be construed as being limited thereto.

The analyzing methods used in the examples are as follows.
(1) Determination of Main Chain Type Liquid Crystalline Polyester Formulations A polyester was dissolved in deuterated chloroform and determined of formulation by means of $^1$H-NMR at 400 MHz (JNM-GX400 manufactured by Nippon Electronics Co., Ltd.).
(2) Measurement of Inherent Viscosity Inherent viscosity was measured in a mixed solvent of phenol/tetrachloroethane (60/40 weight ratio) at a temperature of 30° C. using an Ubbellohde viscometer.
(3) Observation of Phase Behavior The liquid crystal phase behavior was observed using an Olympus BH2 polarizing microscope while heating a sample on a Metler hot stage.

The phase transition temperature was measured using a differential scanning calorimeter DSC7 manufactured by Perkin Elmer Co.
(4) Parameter Measurement of Liquid Crystal Film The retardation of a nematic orientation was measured using the Berek compensator attached to an Olympus BH2 polarizing microscope.

The twisted angle and retardation of a twisted nematic structure were obtained by measuring and analyzing the spectrum of transmitted light through a sample disposed variously in position between two polarizers in accordance with a conventional manner.
(5) Purity (HPLC) Analyzing Method The purity of each sample was measured by a high performance liquid chromatography LC-9A manufactured by Shimadzu Corporation. The analysis conditions are as follows:

Column: CAPCELL PAK C18, Type MG manufactured by Shiseido Co., Ltd.

Moving phase: water/acetonitrile/phosphoric acid=60/40/0.1 (volume ratio)

Flow rate: 1 ml/minute

Detector: UV detector (254 nm of measurement wavelength

EXAMPLE 1

76.97 g (722 mmol) of a chloroethylvinylether, 9.70 g (30.1 mmol) of a tetrabutylammoniumbromide, and 100.00 g (602 mmol) of ethyl 4-hydroxybenzoate, all manufactured by Tokyo Kasei Kogyo Co., Ltd. were mixed with an N-methylpyrrolidone solvent and stirred at a temperature of 120° C. for 3 hours so as to be reacted. The resulting solution was diluted with water and extracted with ethyl acetate so as to remove the solvent thereby obtaining a crude ethyl 4-(2-vinyloxyethoxy)benzoate. A solution of 43.69 g (662 mmol) of potassium hydroxide with 85% purity was added to the ester and reacted at a temperature of 100° C. for 6 hours to be hydrolyzed, followed by dilution and precipitation with a solution of 91.40 g (662 mmol) of sodium hydrogensulfate monohydrate thereby obtaining a crude crystal of 4-(vinyloxyethoxy)benzoic acid. The resulting crude crystal was dissolved in acetonitrile so as to be recrystallized thereby obtaining a needle-like crystal of 4-(vinyloxyethoxy)benzoic acid with an HPLC purity of 99.5 percent or higher. The yield was 104.0 g (83%).

A mixture of 20.00 g (96.0 mmol) of the crystal and 12.41 g (96.0 mmol) of N,N-diisobutylethylamine was dissolved in tetrahydrofuran having been purified by distillation. The solution thus obtained was added dropwise at a temperature of 0° C. to a tetrahydrofuran solution of distilled methanesulfonylchloride thereby obtaining a metalsulfonic acid anhydride of 4-(vinyloxyethoxy)benzoic acid. In this anhydride were dissolved 17.72 g (87.3 mmol) of terephthalic acid chloride, 8.12 g (65.4 mmol) of methylhydroquinone, and 7.21 g (65.5 mmol) of catechol, followed by dropwise addition of a tetrahydrofuran solution of 28.71 g (284 mmol) of triethylamine, and 2.67 g (21.8 mmol) of N,N-dimethylaminopyridine. The mixed solution was reacted at a temperature of 0° C. for 2 hours and then heated to a temperature of 60° C. and reacted for 4 hours. Thereafter, the reaction solution was poured into an excess amount of methanol cooled to −20° C., and then the reaction product was reprecipitated, washed, and dried thereby obtaining a main chain type liquid crystalline polyester 1 represented by formula (1) below. The polyester 1 was a white powdery material at ordinary temperature and assumed a flowable thermotropic liquid crystal state when heated and an isotropic phase at a temperature of around 230° C. The inherent viscosity of the polyester 1 was measured and found to be 0.085. The inherent viscosity and phase behavior measured by DSC of the polyester are shown in Table 1. The NMR spectrum of the resulting polyester 1 is shown in FIG. 1.

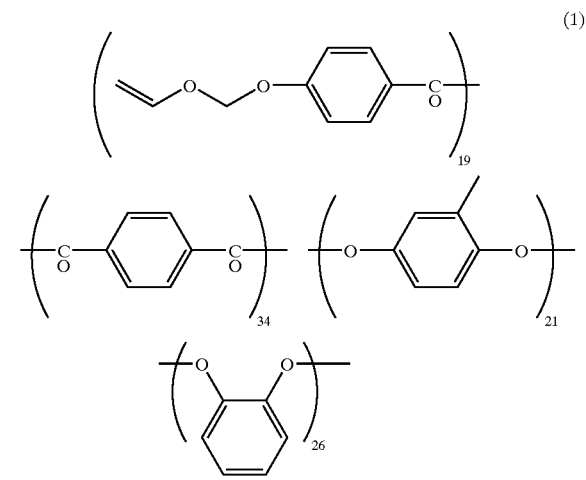

To a deuterated chloroform solution of 10 percent by mass of the main chain type liquid crystalline polyester 1 obtained above heated at a temperature of 75° C. was added a boron trifluoride ether complex in an amount of 1.0 percent by mass based on the polyester 1. Thereafter, the polyester 1 appeared to be reacted and gelled due to cation polymerization, and insolubles were precipitated. The insolubles were filtrated. A proton NMR analysis of the dissolved components revealed the presence of a peak indicating that the vinylether portion of the polyester 1 was polymerized and a polymethylene chain was formed.

EXAMPLE 2

Figure 2:
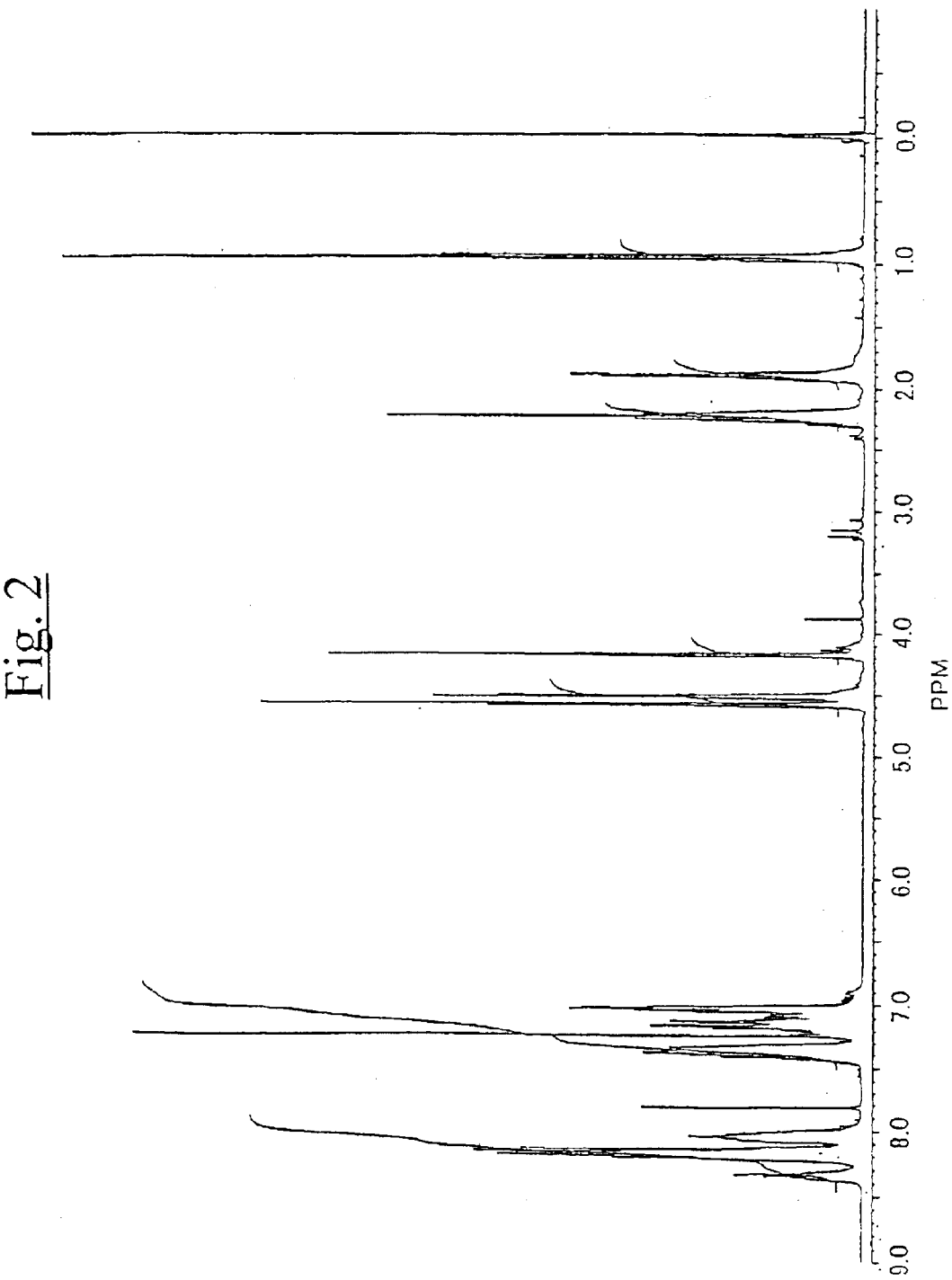
FIG. 2 shows the NMR spectrum chart of the liquid crystalline polyester 2 obtained in Example 2.

3-ethyl-3-hydroxymethyloxetane (OXT-101, manufactured by Toagosei Co., Ltd.) was dissolved in carbon tetrachloride and reacted with an excess amount of triphenylphosphine. The reaction solution was purified by distillation thereby obtaining 3-chloromethyl-3-ethyloxetane. The same procedures for Example 1 above were followed but the 3-chloromethyl-3-ethyloxetane was used instead of chloroethylvinylether of Example 1 thereby obtaining 4-(3-(3-ethyloxetanyl)methoxy)benzoic acid. A mixture of 12.00 g (50.8 mmol) of the carboxylic acid thus obtained and 6.56 g (50.8 mmol) of N,N-diisobutylethylamine was dissolved in tetrahydrofuran having been purified by distillation. The solution thus obtained was added dropwise at a temperature of 0° C. to a tetrahydrofuran solution of distilled methanesulfonylchloride thereby obtaining a methanesulfonic acid anhydride of the carboxylic acid. In this anhydride were dissolved 9.37 g (46.2 mmol) of terephthalic acid chloride, 4.30 g (34.6 mmol) of methylhydroquinone, and 3.81 g (34.6 mmol) of catechol, followed by dropwise addition of a tetrahydrofuran solution of 15.18 g (150.0 mmol) of triethylamine and 1.41 g (11.5 mmol) of N,N-dimethylaminopyridine. The mixed solution was reacted at a temperature of 0° C. for 2 hours and then heated to a temperature of 60° C. and reacted for 4 hours. Thereafter, the reaction solution was poured into an excess amount of methanol at room temperature, and then the reaction product was reprecipitated, washed, and dried thereby obtaining a main chain type liquid crystalline polyester 2 represented by formula (2) below. The NMR spectrum of the resulting polyester 2 is shown in FIG. 2.

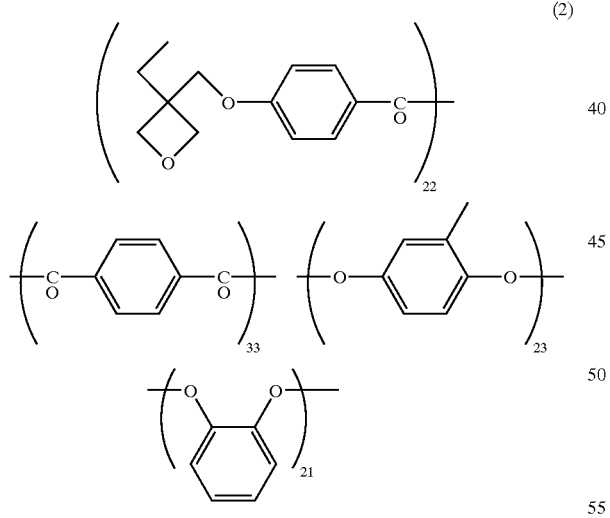

(2)

Similarly to Example 1, to a deuterated chloroform solution of 10 percent by mass of the main chain type liquid crystalline polyester 2 obtained above heated at a temperature of 75° C. was added powdery aluminum trichloride in an amount of 1.0 percent by mass based on the polyester 2. Thereafter, the polyester 2 appeared to be reacted and gelled due to cation polymerization, and a large amount of insolubles was precipitated. The insolubles were filtrated. A proton NMR analysis of the components dissolved in a slight amount revealed the presence of a peak indicating that the oxetane portion of the polyester 2 was ring-opening polymerized and a polyether chain was formed. After the infrared absorption spectrum of the precipitated gel was observed, it was confirmed that an absorption peak of 995 cm$^{-1}$ originating from the oxetane ring had completely disappeared and a ring-opening polymerization reaction occurred.

EXAMPLE 3

Figure 3:
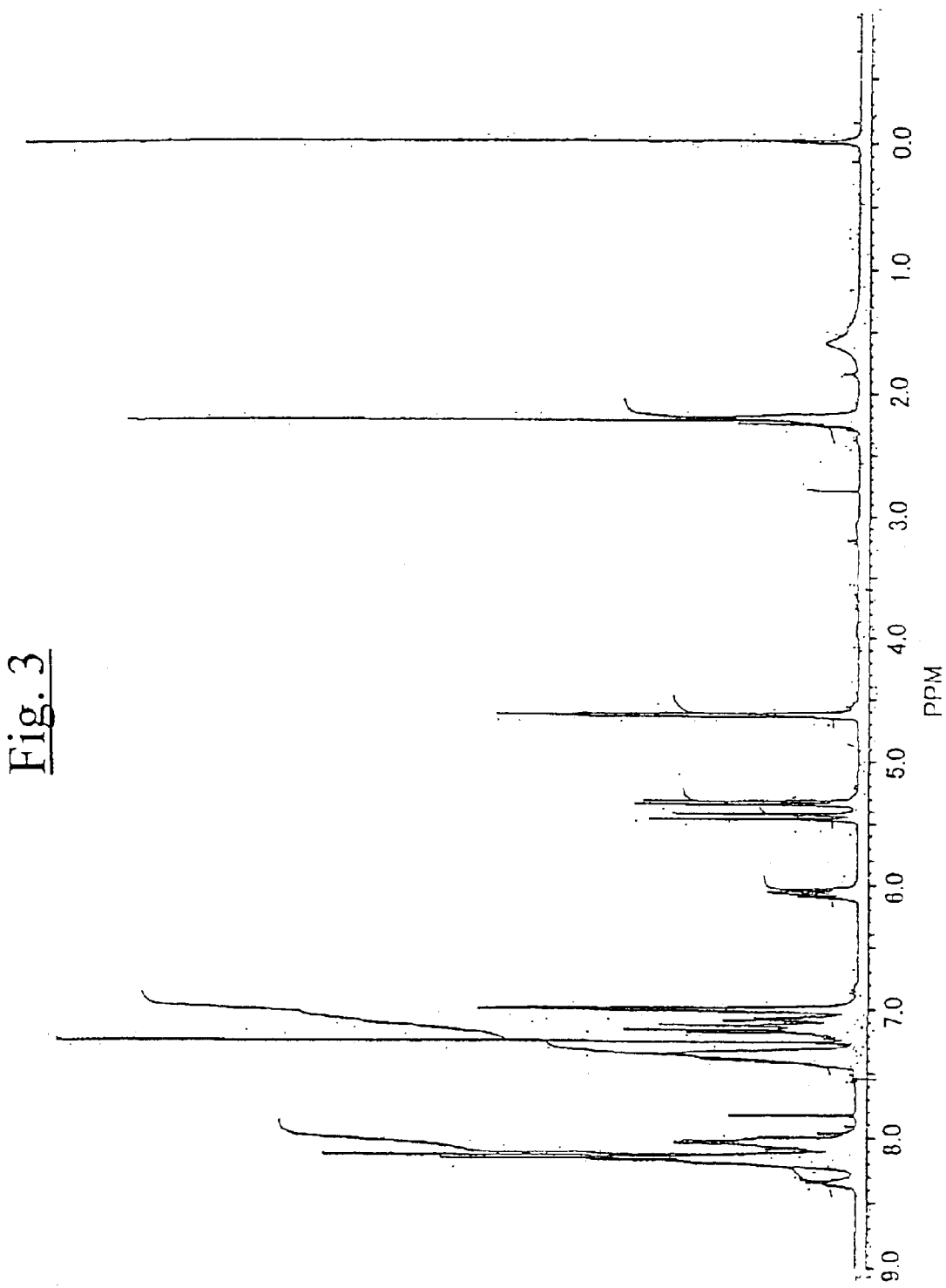
FIG. 3 shows the MNR spectrum chart of the liquid crystalline polyester 3 obtained in Example 3.

A mixture of 13.6 g (96.0 mmol) of 4-allyloxy benzoic acid and 12.4 g (96.0 mmol) of N,N-diisobutylethylamine was dissolved in tetrahydrofuran having been purified by distillation. The solution thus obtained was added dropwise at a temperature of 0° C. to a tetrahydrofuran solution of distilled methanesulfonylchloride thereby obtaining a methanesulfonic acid anhydride of 4-allyloxy benzoic acid. In this anhydride were dissolved 17.7 g (87.3 mmol) of terephthalic acid chloride, 8.1 g (65.4 mmol) of methylhydroquinone, and 7.2 g (65.5 mmol) of catechol, followed by dropwise addition of a tetrahydrofuran solution of 28.7 g (284 mmol) of triethylamine and 2.67 g (21.8 mmol) of N,N-dimethylaminopyridine. The mixed solution was reacted at a temperature of 0° C. for 2 hours and then heated to a temperature of 60° C. and reacted for 4 hours. Thereafter, the reaction solution was poured into an excess amount of methanol cooled to a temperature of −20° C., and then the reaction product was reprecipitated, washed, and dried thereby obtaining a main chain type liquid crystalline polyester 3 represented by formula (3) below. The NMR spectrum of the resulting polyester 3 is shown in FIG. 3.

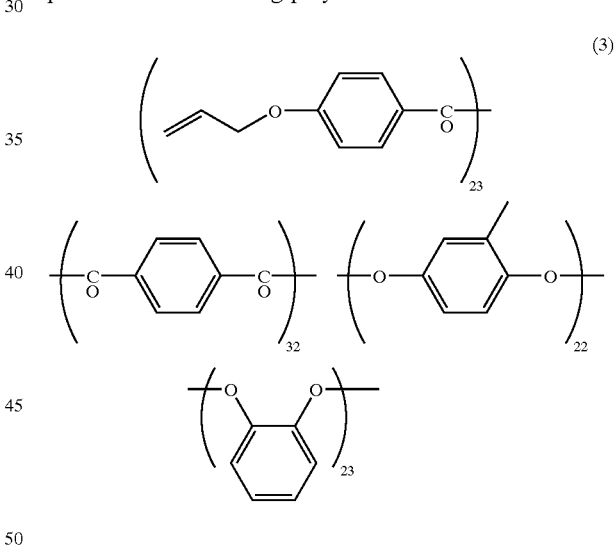

(3)

EXAMPLE 4

Figure 4:
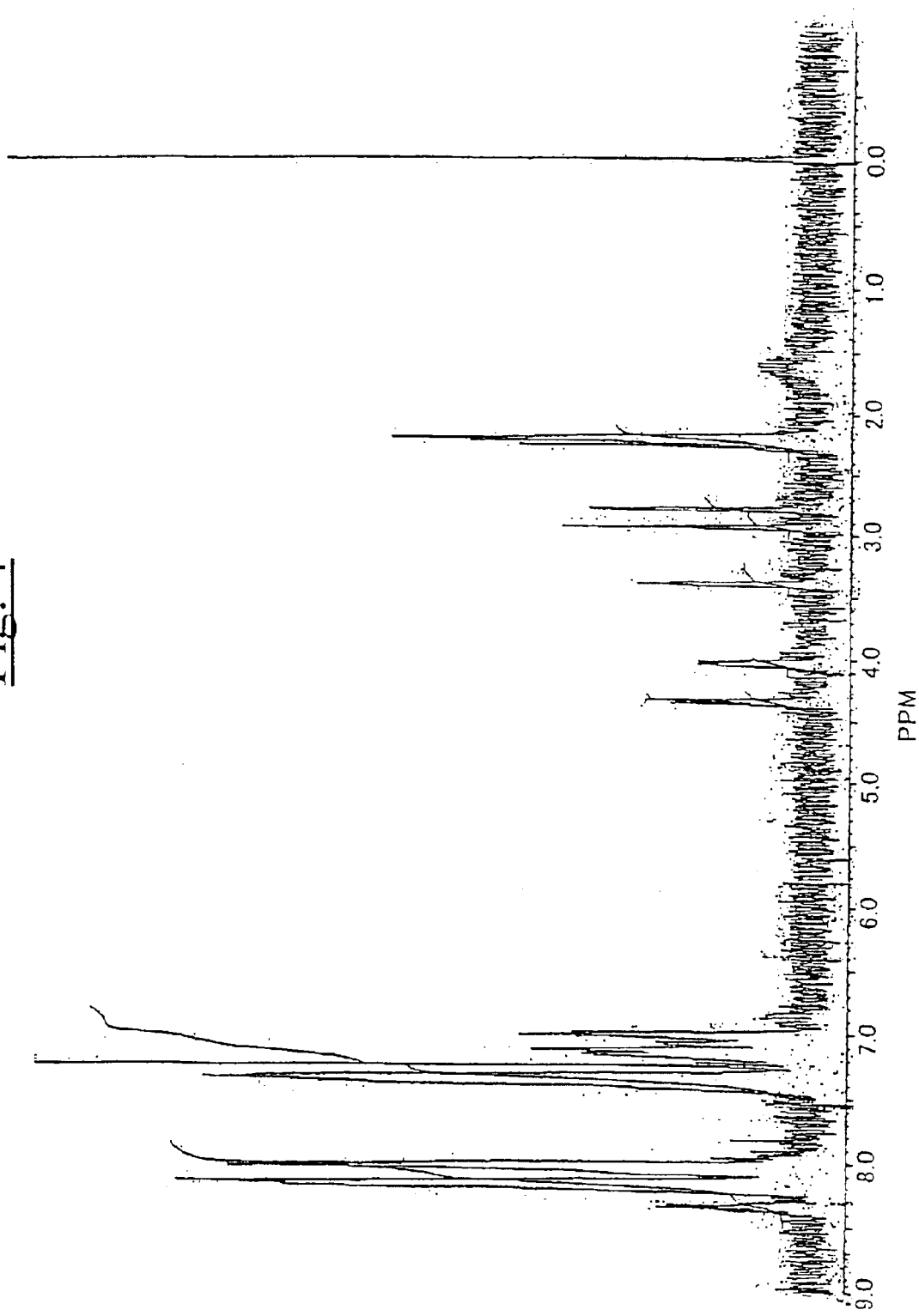
FIG. 4 shows the NMR spectrum chart of the liquid crystalline polyester 4 obtained in Example 4.

10 g of the main chain type liquid crystalline polyester 3 obtained in Example 3 were dissolved in 500 ml of dichloromethane, and 8.0 g of 3-chloroperoxybenzoic acid, followed by stirring at room temperature for 7 days. After precipitates from the reaction solution was separated by filtration, a saturated aqueous solution of sodium hydrogensulfite was added to the filtrate, followed by vigorous stirring. The separated organic layer was washed with a saturated aqueous solution of sodium hydrogencarbonate, and magnesium sulfate was added thereto. After the mixture was dried and evaporated so as to remove the solvent, it was washed with methanol and dried with a vacuum drier thereby obtaining a main chain type liquid crystalline polyester 4 represented by formula (4). The main chain type liquid crystalline polyester 4 was dissolved in a deuterated chloroform solution and subjected to an NMR measurement. As a result, it was confirmed that a peak of the allyl group disappeared completely and an epoxy group was formed instead. The NMR spectrum of the polyester 4 is shown in FIG. 4.

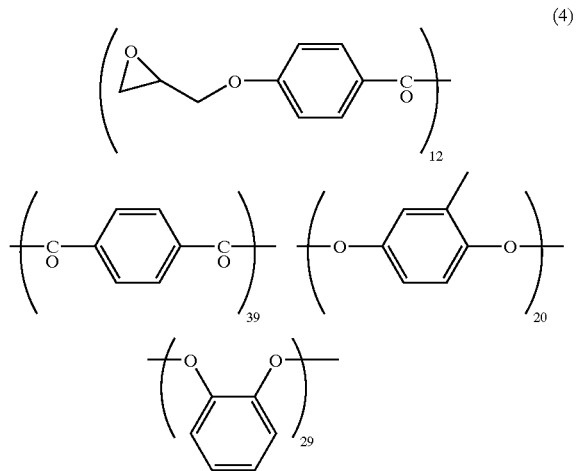

(4)

EXAMPLE 5

5.00 g of the main chain type liquid crystalline polyester 1 synthesized in Example 1 were weighed out and added to and dissolved in 15.00 g of cyclohexanone. 0.05 g of a photo acid generator TAZ-106 manufactured by Midori Kagaku Co., Ltd were added to the solution. Insolubles were filtered out from the solution with a polytetrafluoroehylene filter with a pore size of 0.45 μm thereby obtaining a solution of a liquid crystalline composition.

The solution was spin-coated over a 50 μm thick polyethyleneterephthalate film T-60 (manufactured by Toray Industries, Inc) with a surface rubbed with a rayon cloth, and a hot air of 60° C. was slowly blown thereto to remove the solvent. The thickness of the liquid crystalline composition layer thus obtained was measured with a contact type film thickness meter and found to be 7.3 μm. The liquid crystalline composition layer on the polyethyleneterephthalate film was heated in an oven at a temperature of 160° C. for 3 minutes so as to align the composition in a uniform liquid crystal orientation. This film is referred to as "film 1a". The pencil hardness of the film 1a was 6B or less and it thus found to be soft. After a portion of the liquid crystalline composition layer of the film 1a was transferred to a triacetylcellulose (TAC) film with a pressure-sensitive adhesive, the retardation of the portion was measured. It was confirmed that the retardation was 1015 nm as a slow axis which is a direction parallel to the rubbing axis direction of the polyethyleneterephthalate film. It was also confirmed that the orientation was free of disclination and in a completed state.

Thereafter, the film 1a was irradiated with an ultraviolet light in an integrated irradiation dose of 450 mJ using a high-pressure mercury lamp and heated at a temperature of 160° C. in an oven for 1 minute thereby obtaining a cured liquid crystalline composition layer hereinafter referred to as "film 1b". Since the polyethyleneterephthalate film used as an alignment substrate had a birefringence, the film 1b was transferred via an ultraviolet curing-type adhesive "UV-3400" manufactured by Toagosei Co., Ltd. onto a TAC film thereby obtaining an optical film 1. More specifically, UV-3400 with a thickness of 5 μm was coated over the cured liquid crystalline composition layer on the film and laminated with a TAC film. After the laminate was subjected to an irradiation of ultraviolet light of 400 mJ/cm² from the TAC film side so as to cure the adhesive, the polyethylenetelephthalate film (substrate) was peeled off.

As a result of observations of the resulting optical film with a polarizing microscope, it was confirmed that it had a uniform liquid crystal orientation similarly to the film 1a and the retardation was 885 nm. Only the liquid crystalline composition layer portion was scrapped off from the optical film, and the glass transition temperature (Tg) of the portion was measured using a DSC. As a result, it was found to be 107° C. This indicates that the Tg was 54° C. higher than that of the main chain type liquid crystalline polyester 1 whose Tg was 53° C., used as the starting material and increased due to the cross-linking reaction (curing) The pencil hardness of the liquid crystalline composition layer surface of the optical film 1 was on the order of 2H and thus it was confirmed that a hard layer was obtained. It was also confirmed that a film with a uniform orientability and excellent thermal stability and strength can be produced using the main chain type liquid crystalline polyester 1.

EXAMPLE 6

An optically active main chain type liquid crystalline polyester 5 represented by formula (5) below was obtained using (R)–(+)1,1'-bi-naphtol manufactured by Environmental Science Research Center Co., Ltd. as the starting material for the optical active unit.

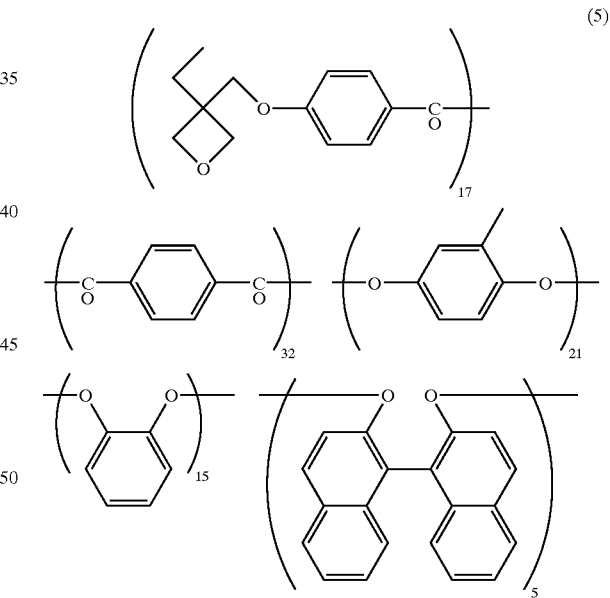

(5)

4.52 g and 0.48 g were weighed out from main chain type liquid crystalline polyesters 2 and 5, respectively and dissolved in 15.00 g of triethylene glycol dimethylether. To the solution thus obtained was added 0.05 g of a photo acid generator SP-172 manufactured by Asahi Denka Co., Ltd. The mixture was filtered with a polytetrafluoroehylene filter with a pore size of 0.45 μm so as to remove the insolubles thereby obtaining a solution of a liquid crystalline composition.

The solution thus obtained was spin-coated over a 50 μm thick polyethylenenaphthalate film (manufactured by Teijin Limited) with a surface rubbed with a rayon cloth, and a hot air of 60° C. was slowly blown thereto to remove the solvent. The thickness of the liquid crystalline composition layer thus obtained was measured with a contact type film thickness meter and found to be 6.8 μm. The liquid crystalline composition layer on the polyethylenenaphthalate film was heated in an oven at a temperature of 160° C. for 3 minutes so as to align the composition in a uniform liquid crystal orientation. Thereafter, the film with the liquid crystalline composition layer was irradiated with an ultraviolet light in an integrated irradiation dose of 200 mJ using a high-pressure mercury lamp while being heated at a temperature of 120° C. so as to be cured. The liquid crystalline composition layer thus cured was transferred via a pressure-sensitive adhesive formed on a surface of a TAC film thereto thereby obtaining an optical film 2. As a result of observations of the optical film 2 with a polarizing microscope, it was found that it had a uniform twisted nematic liquid crystal orientation and the retardation and twisted angle were 820 nm and −230 degrees (right-hand twist). Only the liquid crystalline composition layer portion was scrapped off only from the optical film 2, and the glass transition temperature (Tg) of the portion was measured using a DSC and was 115° C. This indicates that the Tg was higher than that of either the main chain type liquid crystalline polyester 2 or 5 both used for producing the optical film 2 and increased due to the cross-linking reaction (curing). The pencil hardness of the liquid crystalline composition layer surface of the optical film 2 was on the order of 2H and thus it was confirmed that a hard layer was obtained.

Figure 5:
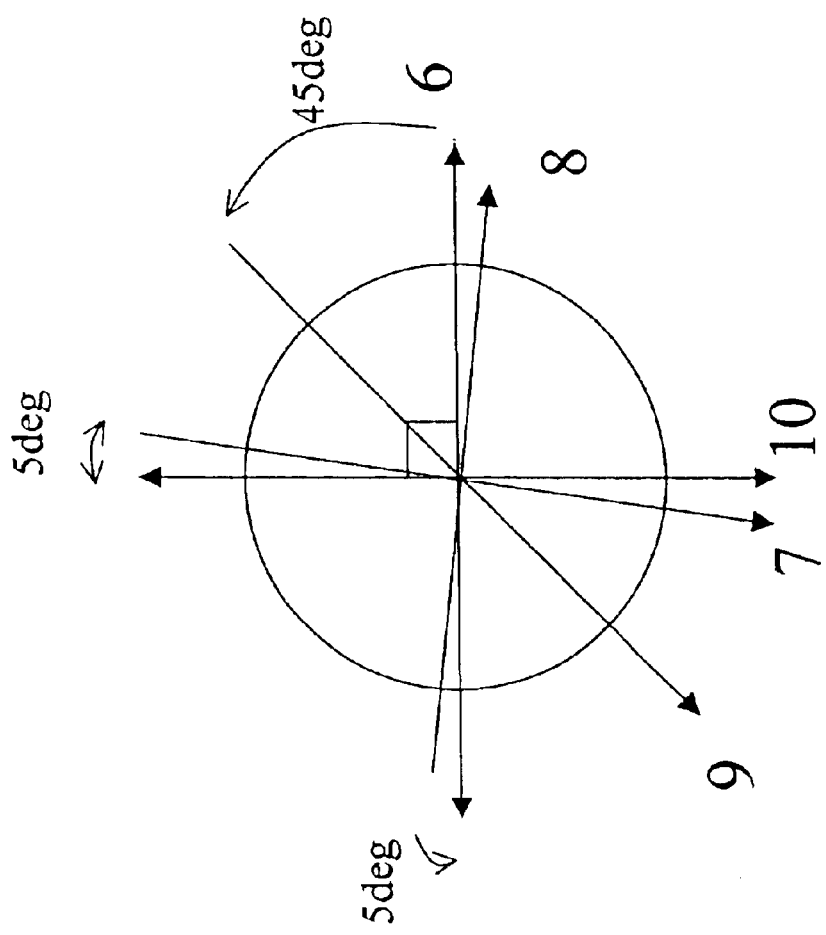
FIG. 5 is schematic view showing the perspective view (a) and axial arrangement (b) of the liquid crystal display used in Example 6.
Figure 5:
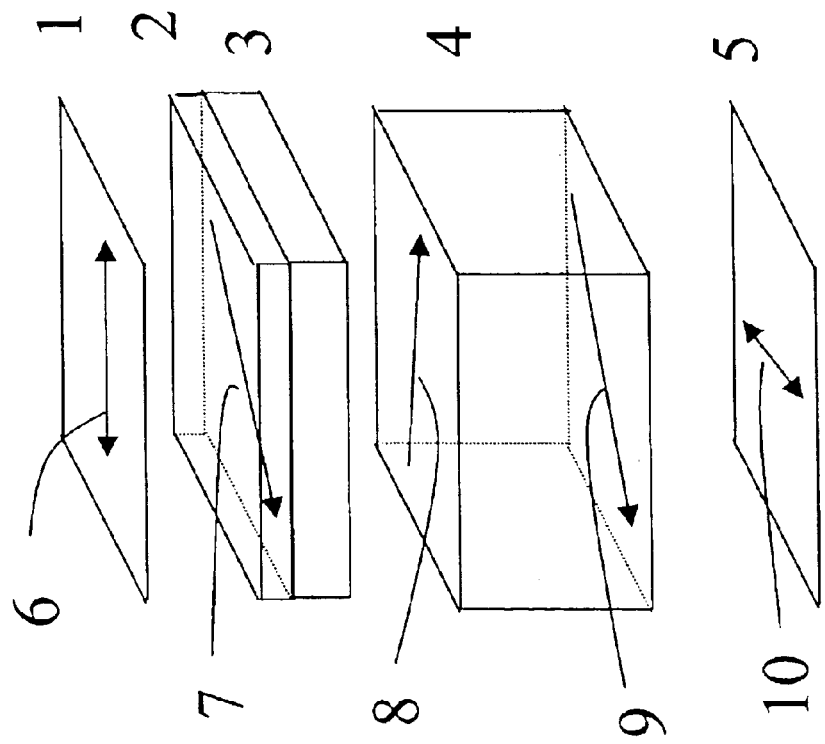

A liquid crystal display shown in FIG. 5 was produced using the optical film 2. The liquid crystal cell used was an STN type liquid crystal cell with a twisted angle of 230 degrees (left-hand twsit) and a retardation of 850 nm. As a result, a vivid black and white image was obtained due to the use of the optical film 2. It was thus confirmed that the optical film 2 functioned as a color compensation film. The images produced by only a polarizer and an STN type liquid crystal cell even though many arrangements were attempted were colored and blurred.

EXAMPLE 7

An optically active main chain type liquid crystalline polyester 6 represented by formula (6) was synthesized from 4,4'-biphenyldicarboxylic acid dichloride and (S)-methylbutanediol in accordance with a conventional manner.

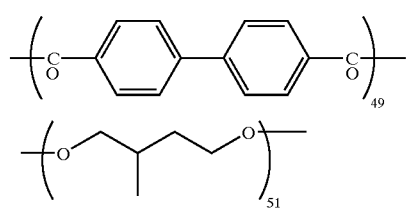

(6)

8.2 g and 1.8 g were weighed out from the main chain type liquid crystalline polyesters 4 and 6, respectively and dissolved in 90 g of 1,1,2,2-tetrachloroethane. To the solution thus obtained was added 0.1 g of a photo acid generator SP-172 manufactured by Asahi Denka Co., Ltd. The mixture was filtered with a polytetrafluoroehylene filter with a pore size of 0.45 μm so as to remove the insolubles thereby obtaining a solution of a liquid crystalline composition.

The solution thus obtained was spin-coated over a rubbed polyimide layer formed over a glass substrate. The glass substrate was heated at a temperature of 50° C. on a hot plate so as to remove the solvent and then at a temperature of 170° C. in an oven for 10 minutes. Thereafter, the glass substrate was irradiated with an ultraviolet light in an integrated irradiation dose of 200 mJ using a high-pressure mercury lamp while being heated at a temperature of 150° C. The liquid crystalline composition layer on the glass substrate had a cholesteric orientation and exhibited a vivid red selective reflection light. As a result of the measurement of the selective reflection light using a spectroscope, it was found that the center wavelength was 640 nm.

The pencil hardness of the liquid crystalline composition layer was on the order of HB and thus it was found to be an excellent film layer.

EXAMPLE 8

A main chain type liquid crystalline polyester represented by formula (7) and a liquid crystalline compound represented by formula (8) were synthesized in a conventional manner.

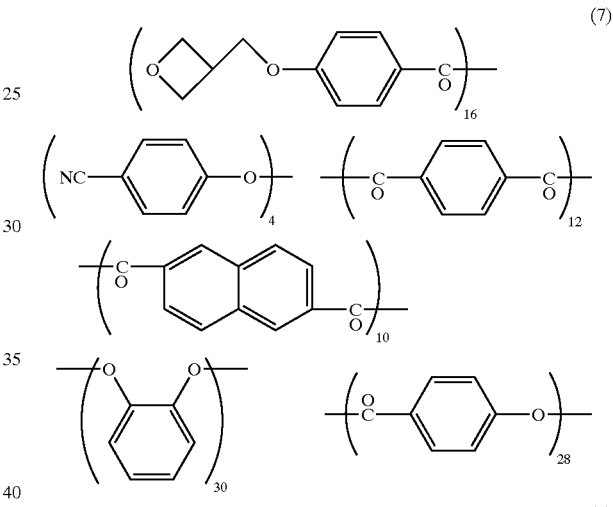

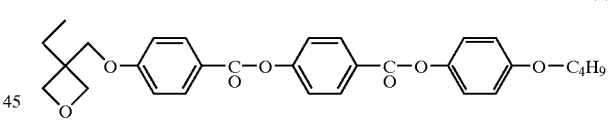

(8)

8.0 g and 2.0 g were weighed out from the main chain type liquid crystalline polyester and the liquid crystalline compound, respectively and dissolved in 90 g of N-methylpyrrolidone. To the solution thus obtained was added 0.05 g of a photo acid generator SP-172 manufactured by Asahi Denka Co., Ltd. The mixture was filtered with a polytetrafluoroethylene filter with a pore size of 0.45 μm so as to remove the insolubles thereby obtaining a solution of a liquid crystalline composition.

The solution was spin-coated over a 50 μm thick polyphenylenesulfide film manufactured by Toray Industries, Inc with a surface rubbed with a rayon cloth and heated on a hot plate kept at a temperature of about 80° C. so as to remove the solvent. The film was placed in an oven kept at a temperature of 160° C. for two minutes After the temperature of the oven was decreased to 110° C. over a period of 30 minutes, the film was removed out from the oven to the outside at room temperature. The film was irradiated with an ultraviolet light in an integrated irradiation dose of 400 mJ using a high-pressure mercury lamp while being heated at a temperature of 120° C. The liquid crystalline composition layer portion thus formed on the film was transferred via a pressure-sensitive adhesive formed on a surface of a TAC film thereto thereby obtaining an optical film 3.

Figure 6:
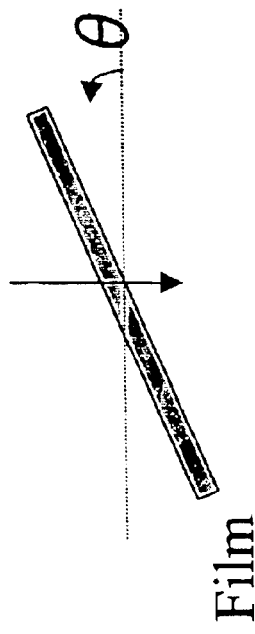
FIG. 6 is a view describing a method of measuring the tilt angle dependency of the apparent retardation of the film 3 obtained in Example 8 and a graph indicating the results thereof.
Figure 6:
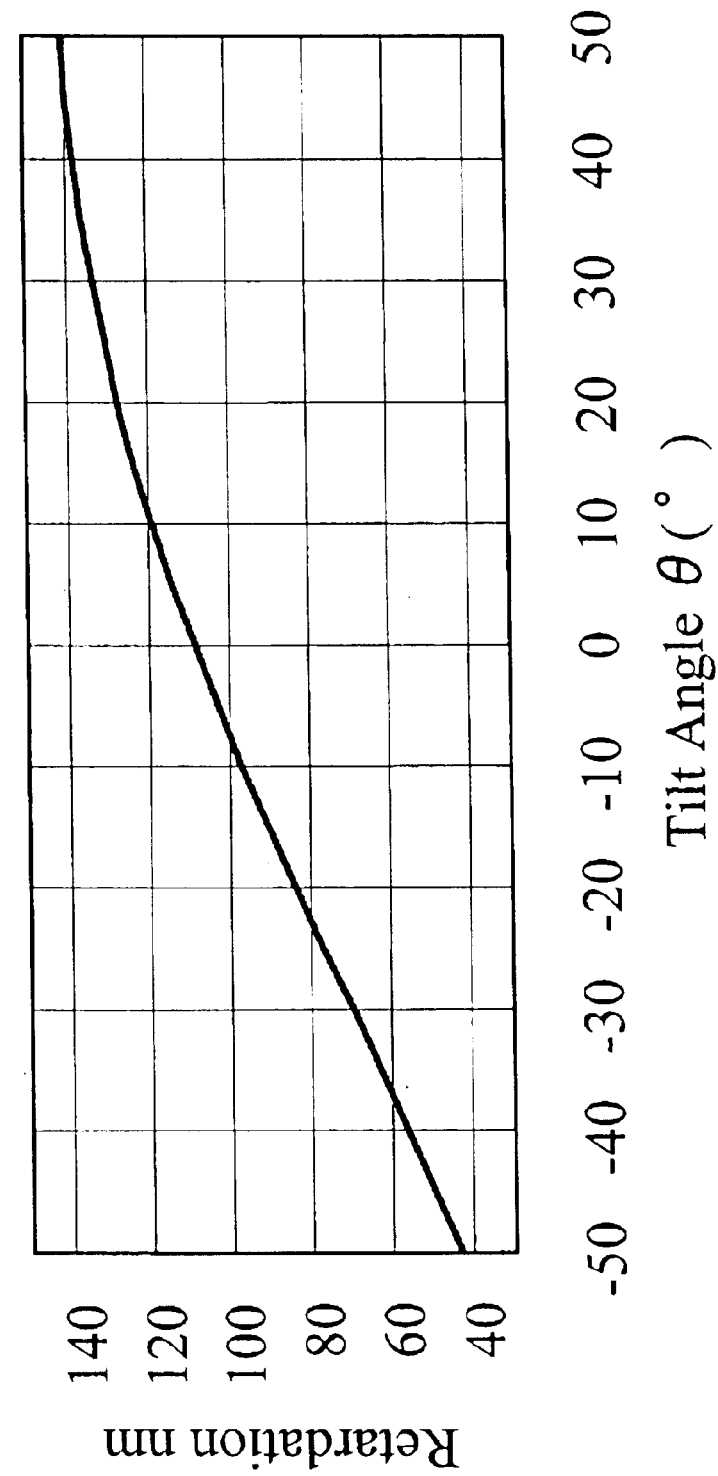

When the optical film 3 was viewed from the front, it had a retardation which is similar to that of a uniaxial nematic orientation. However, when the optical film 3 was viewed from a oblique direction along the rubbing direction, the apparent retardation varied depending on the oblique direction as shown in FIG. 6. It was thus found that the liquid crystalline composition layer had a hybrid orientation wherein the direction of the orientation changed in the thickness direction.

Figure 7:
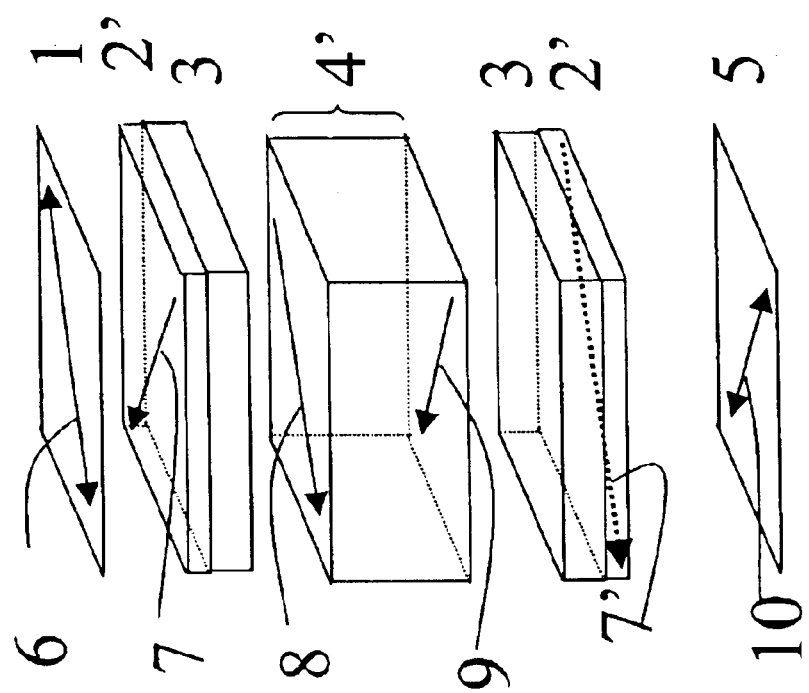
FIG. 7 is a schematic perspective view of the liquid crystal display used in Example 8.

Two sheets of the optical films 3 were arranged for compensation with respect to a 90-degree twisted liquid crystal cell provided with electrodes (TN type liquid crystal cell), as shown in FIG. 7. As a result, it was found that the liquid crystal device with the optical films 3 was capable of providing images with an extremely wider viewing angle, compared with a device free of the films.

COMPARATIVE EXAMPLE 1

A liquid crystalline polyester 9 represented by formula (9) below was synthesized using the same formulations and methods as those of Example 1 except that 4-octyloxybenzoic acid which has no polymerizable group was used instead of 4-(vinyloxyethoxy)benzoic acid obtained in Example 1.

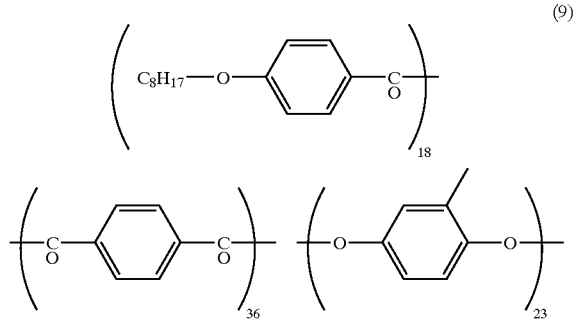

(9)

-continued

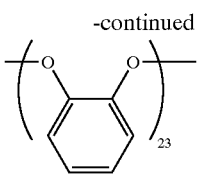

The liquid crystalline polyester 9 was a white solid with a slight tackiness even at room temperature and exhibited a liquid crystallinity with fluidity at a temperature of around 80° C. and an isotropic phase at a temperature of 265° C. Similarly to Examples 1 and 2, a Lewis acid such as aluminum trichloride was added to a deuterated chloroform solution of the liquid crystalline polyester 9. However, no remarkable change was observed except that the solution was slightly colored in yellow and no change was observed through the NMR measurement.

Furthermore, the production of an optical film 4 was attempted using the liquid crystalline polyester 9 in accordance with the procedures of Example 5. As a result, the retardation of the optical film 4 was 440 nm which was less than a half of that of the optical film 1b. It was found that the reason for this was that the ultraviolet curing-type adhesive dissolved a part of the liquid crystalline composition layer. As a result of the DSC measurement of the liquid crystalline composition layer scrapped off from the optical film 4, it was found that the Tg of the composition layer was 55° C. which is almost the same as that of the liquid crystalline polyester 9, i.e., the starting material and thus the optical film 4 was weak to heat. The pencil hardness of the liquid crystalline composition layer of the optical film 4 was 6B or softer.

Table 1 shows the phase behaviors of the liquid crystalline polyesters 1 to 7 and 9 and liquid crystalline compound 8 used in Examples 1 to 8 and comparative example 1.

TABLE 1

| | Inherent V (dl/g) | Phase Behavior |
|---|---|---|
| Liquid Crystalline Polyester 1 | 0.085 | Glass State $\xrightarrow{53°\,C.}$ Nm $\xrightarrow{230°\,C.}$ Isotropic Phase |
| Liquid Crystalline Polyester 2 | 0.090 | Glass State $\xrightarrow{68°\,C.}$ Nm $\xrightarrow{268°\,C.}$ Isotropic Phase |
| Liquid Crystalline Polyester 3 | 0.078 | Glass State $\xrightarrow{64°\,C.}$ Nm $\xrightarrow{252°\,C.}$ Isotropic Phase |
| Liquid Crystalline Polyester 4 | 0.081 | Glass State $\xrightarrow{65°\,C.}$ Nm $\xrightarrow{190°\,C.}$ Isotropic Phase |
| Liquid Crystalline Polyester 5 | 0.065 | Glass State $\xrightarrow{72°\,C.}$ Ch $\xrightarrow{215°\,C.}$ Isotropic Phase |
| Liquid Crystalline Polyester 6 | 0.152 | (Partially Glass State) $\xleftarrow{16°\,C.}$ Crystal Phase $\xleftarrow{140°\,C.}$ Ch $\xleftarrow{175°\,C.}$ Isotropic Phase |
| Liquid Crystalline Polyester 7 | 0.087 | Glass State $\xrightarrow{88°\,C.}$ Nm $\xrightarrow{290°\,C.}$ Isotropic Phase |

TABLE 1-continued

| | Inherent V (dl/g) | Phase Behavior |
|---|---|---|
| Liquid Crystalline Com | — | Crystal Phase →135° C.→ Nm →143° C.→ Isotropic Phase |
| Liquid Crystalline Polyester 9 | 0.088 | Glass State →51° C.→ Nm →265° C.→ Isotropic Phase |

Nm: Nematic Phase
Ch: Cholesteric Phase
Phase transition temperature is a value of the second time temperature rise in DSC.
However, the value of the liquid crystalline polyester 6 is a value of the first temperature drop.
A temperature rise/drop rate was 10° C./min.

What is claimed is:

1. A main chain type liquid crystalline polyester which comprises at least two units selected from aromatic diol units, aromatic dicarboxylic acid units, and aromatic hydroxycarboxylic acid units as essential units and a structural unit containing a cationically polymerizable group selected from the group consisting of vinyloxy groups, epoxy groups, and oxetany groups in at least one of the terminal ends of the main chain.

2. The main chain type liquid crystalline polyester according to claim 1; wherein said diol units are catechol derivatives represented by the following general formula:

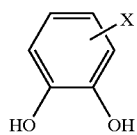

wherein —X is selected from the following groups: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$) CH$_3$, —CH(CH$_3$) CH$_2$CH$_3$, —C(CH$_3$)$_3$, —OCH$_3$, —OC$_2$OH$_5$, —OC$_6$H$_5$, —OCH$_2$C$_6$H$_5$, —F, —Cl, —Br, —NO$_2$ and —CN.

3. The main chain type liquid crystalline polyester according to claim 2 which exhibits liquid crystallinity when it is in a molten state and is from 0.03 to 0.50 dl/g in inherent viscosity η measured in a phenol/tetrachloroethane mixed solvent (weight ratio: 60/40) at a temperature of 30° C.

4. The main chain type liquid crystalline polyester according to any of any one of claims 1 to 3 which is produced by polymerizing at least two kinds of compounds selected from the group consisting of aromatic diols represented by formula A below, aromatic dicarboxylic acids represented by formula B below, and aromatic hydroxycarboxylic acids represented by formula C below and a mono-functional aromatic compound containing a cationically polmerizable group represented by formula D below:

A:

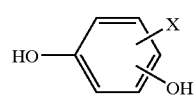

B:

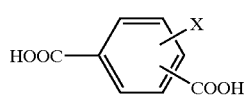

C:

D:

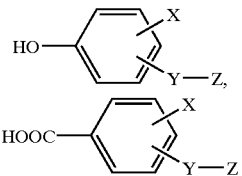

wherein —X, —Y, and —Z each represent any of the following groups as per structural unit:

—X: —H, —CH$_3$, —C$_2$H$_5$, —CH$_2$CH$_2$CH$_3$, —CH(CH$_3$)$_2$, —CH$_2$CH$_2$CH$_2$CH$_3$, —CH$_2$CH(CH$_3$) CH$_3$, —CH(CH$_3$) CH$_2$CH$_3$, —C(CH$_3$)$_3$, —OCH$_3$, —OC$_2$H$_5$, —OC$_6$H$_5$, —OCH$_2$C$_6$H$_5$, —F, —Cl, —Br, —NO$_2$ and —CN;

—Y: direct bond, —(CH$_2$)$_n$—, —O—, —O—(CH$_2$) n—, —(CH$_2$)$_n$—O—, —O—(CH$_2$)$_n$—O—, —O—CO—, —CO—O—, —O—CO—(CH$_2$)$_n$—, —CO—O—(CH$_2$)n—, —(CH$_2$)$_n$—O—CO—, —(CH$_2$)$_n$—CO—O—, —O—(CH$_2$)$_n$—O—CO—, —O—(CH$_2$)$_n$—CO—O—, —O—CO—(CH$_2$)$_n$—O—, —CO—O—(CH$_2$)$_n$—O—, —O—CO—(CH$_2$)$_n$—O—CO— or —CO—O—(CH$_2$)$_n$—CO—O (n is an integer of from 1 to 12);

and —Z:

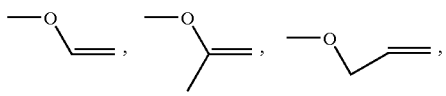

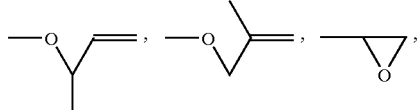

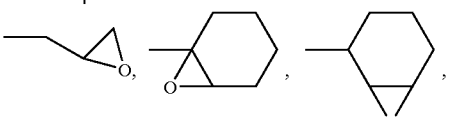

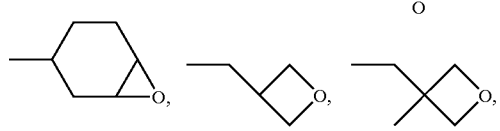

-continued

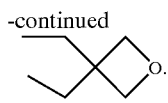

5. A liquid crystalline composition which comprises said main chain type liquid crystalline polyester as defined in any one of claims 1 to 3 and a photo cationic generator and/or a thermal cationic generator.

6. A method of producing a liquid crystal film wherein after a layer of the liquid crystalline composition as defined in claim 5 is formed over a film having an aligning capability and then aligned in a liquid crystal orientation by heating, the liquid crystal orientation is fixed by subjecting said composition to a photo irradiation and/or a heat treatment so as to polymerize the cationically polmerizable group.

7. An optical film which is produced by the method as defined in claim 7.

8. The optical film according to claim 7 which has a function of any of a uniaxial or twisted optical retardation film, a cholesterically oriented type circular polarization reflective film, and a nematic hybrid oriented type compensation film.

9. A display which is equipped with at least one sheet of the optical film as defined in claim 8.

10. The main chain type liquid crystalline polyester according to claim 1 which exhibits liquid crystallinity when it is in a molten state and is from 0.03 to 0.50 dl/g in inherent viscosity η measured in a phenol/tetrachloroethane mixed solvent (weight ratio: 60/40) at a temperature of 30° C.

* * * * *